(12) United States Patent
Myers et al.

(10) Patent No.: US 10,915,004 B2
(45) Date of Patent: Feb. 9, 2021

(54) WAVELENGTH-BASED STEERING OF NON-MECHANICAL BEAM-STEERING DEVICES

(71) Applicant: The Government of the United States of America, as represented by the Secretary of the Navy, Arlington, VA (US)

(72) Inventors: Jason D. Myers, Alexandria, VA (US); Jesse A. Frantz, Washington, DC (US); Christopher M. Spillmann, Annandale, VA (US); Robel Y. Bekele, Washington, DC (US); Henry G. Gotjen, Washington, DC (US); Jawad Naciri, Arlington, VA (US); Jakub Kolacz, Washington, DC (US); L. Brandon Shaw, Woodbridge, VA (US); Jasbinder S. Sanghera, Ashburn, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/287,017

(22) Filed: Feb. 27, 2019

(65) Prior Publication Data
US 2019/0265573 A1 Aug. 29, 2019

Related U.S. Application Data

(60) Provisional application No. 62/635,952, filed on Feb. 27, 2018.

(51) Int. Cl.
*G02F 1/295* (2006.01)

(52) U.S. Cl.
CPC .......... *G02F 1/295* (2013.01); *G02F 2203/24* (2013.01)

(58) Field of Classification Search
CPC ........ G02F 1/313; G02F 1/2955; G02F 1/295; G02F 2203/24; G02B 6/43
See application file for complete search history.

(56) References Cited

U.S. PATENT DOCUMENTS 3,610,727 A * 10/1971 Ulrich ...................... G02B 6/34
372/108
8,995,038 B1 * 3/2015 Anderson ............ G02B 17/023
359/227

(Continued)

*Primary Examiner* — Jennifer Doan
(74) *Attorney, Agent, or Firm* — US Naval Research Laboratory; Suresh Koshy

(57) ABSTRACT

An optical system has a beam-steering device, a light source, and a controller that controls the light source to actively control wavelength of the incoming light to control the output angle of the outgoing light output from the BS device. The BS device may have incoupler, waveguide, and/or outcoupler electrodes, and the system may have corresponding controllable voltage supplies actively controlled by the controller to selectively modify electric fields applied to the BS device to control corresponding operating characteristics of the BS device (e.g., in-plane and/or out-of-plane output angles of the outgoing light and/or device incoupling angle). An alternative optical system has a BS device, a detector array that generates detector signals corresponding to outgoing light received from the BS device, and a controller that processes the detector signals to determine one or more wavelengths of the outgoing light.

19 Claims, 13 Drawing Sheets

(56) References Cited

U.S. PATENT DOCUMENTS 9,366,938 B1 * 6/2016 Anderson ............. G02F 1/1326
2018/0175501 A1 * 6/2018 Byun ..................... G02F 1/292

* cited by examiner

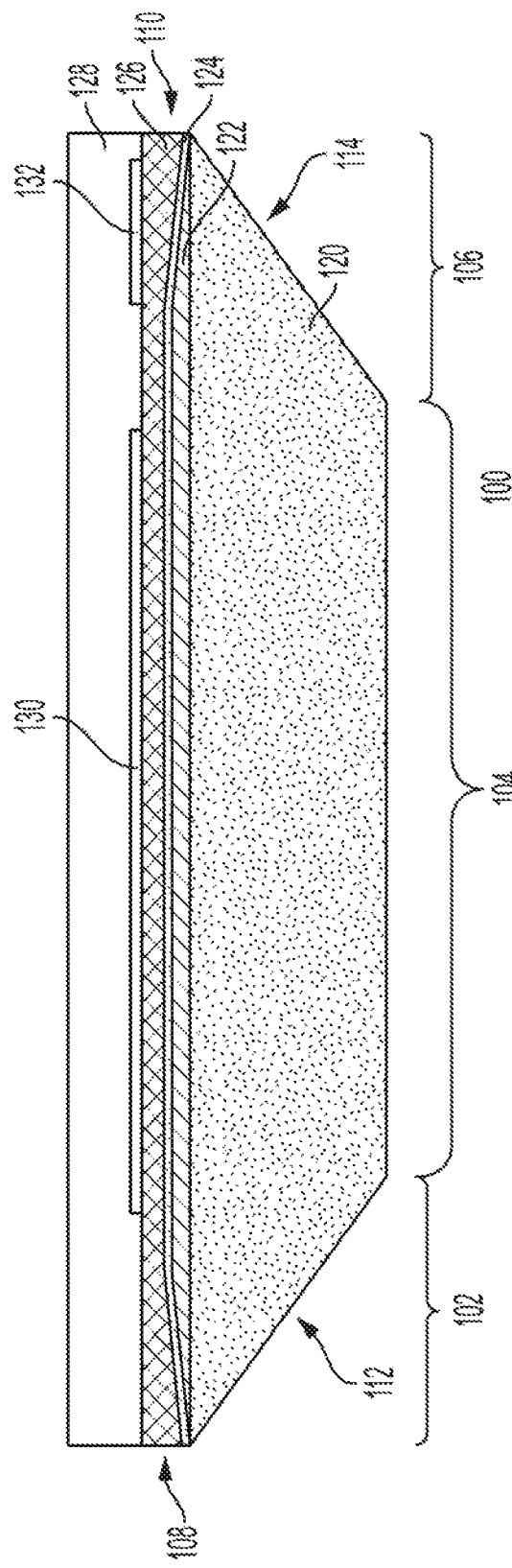
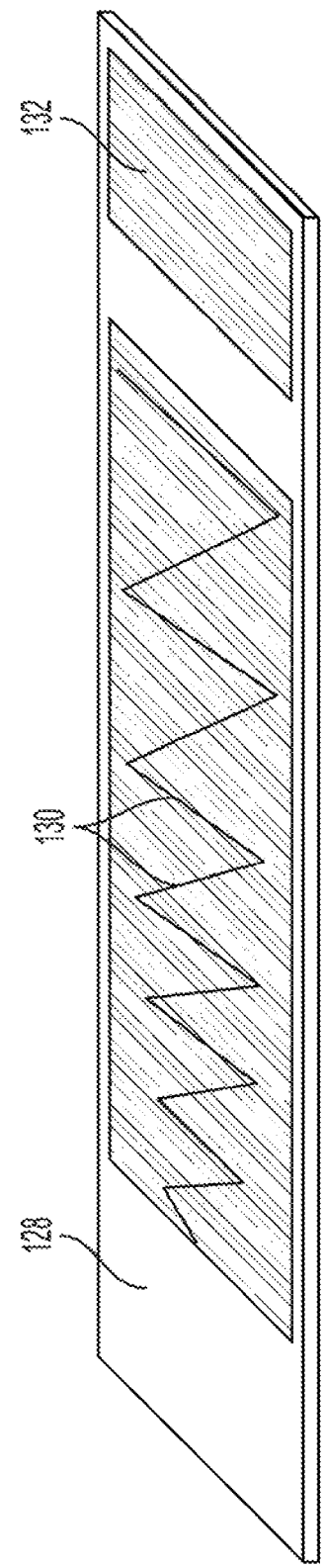
FIG. 1A
PRIOR ART
FIG. 1B
PRIOR ART

WAVELENGTH-BASED STEERING OF NON-MECHANICAL BEAM-STEERING DEVICES

CROSS-REFERENCE TO RELATED APPLICATIONS

This application claims the benefit of the filing dates of U.S. provisional application No. 62/613,190, filed on Jan. 3, 2018; U.S. provisional application No. 62/613,185, filed on Jan. 3, 2018; and U.S. provisional application 62/635,952, filed on Feb. 27, 2018, the teachings of all of which are incorporated herein by reference in their entirety.

The subject matter of this application is related to that of U.S. patent application Ser. No. 16/238,642 and U.S. patent application Ser. No. 16/238,687, both filed on Jan. 3, 2019 and the teachings of both of which are incorporated herein by reference in their entirety.

STATEMENT OF GOVERNMENT INTEREST

Under paragraph 1(a) of Executive Order 10096, the conditions under which this invention was made entitle the Government of the United States, as represented by the Secretary of the Navy, to an undivided interest therein on any patent granted thereon by the United States. This and related patents are available for licensing to qualified licensees.

BACKGROUND

Field of the Invention

The present invention relates to non-mechanical beam-steering devices and optical systems using such devices and, more particularly but not exclusively, to steerable electro-evanescent optical refractors (SEEORs) and optical systems using SEEORs for non-mechanical beam steering (NMBS) and other applications.

Description of the Related Art

This section introduces aspects that may help facilitate a better understanding of the invention. Accordingly, the statements of this section are to be read in this light and are not to be understood as admissions about what is prior art or what is not prior art.

Thin-film slab waveguides are utilized for a variety of applications, including refractive non-mechanical beam steering (NMBS). Typically, these systems are coupled using either external prisms or faceted substrates having a tapered subcladding layer, referred to herein as Ulrich couplers. See R. Ulrich, "Optimum excitation of optical surface waves," *Journal of the Optical Society of America* 61(11), 1467-1477 (1971), the teachings of which are incorporated herein by reference. In both cases, the fundamental method of operation is similar: a tapered region creates a spatially varying interaction between the waveguide core and the prism/substrate. In prism-type optical couplers, a tapered air gap is created using either spacers or pressure to bend the prism substrate, while Ulrich couplers have a tapered subcladding. At a specific point along the tapered region, a phase-matching condition is reached between a guided mode in the coupler's waveguide and the incident light, and coupling into the waveguide is achieved. In such devices, the phase-matching condition is achieved around extremely narrow poles in a calculated resonant term that is dependent on several features of the coupler structure and the interaction of the incident beam with the coupler.

FIG. 1A is a cross-sectional side view of a conventional non-mechanical beam-steering (BS) device 100 of the prior art, and FIG. 1B is a perspective view of the top of the conventional BS device 100 of FIG. 1A, and. The conventional BS device 100 has a planar waveguide region 104 separating a tapered (i.e., faceted), Ulrich incoupler 102 and a tapered, Ulrich outcoupler 106. FIG. 1C is a magnified cross-sectional side view of the Ulrich incoupler 102 and part of the waveguide region 104 of the conventional BS device 100 of FIGS. 1A and 1B.

As represented in FIGS. 1A and 1C, each of the waveguide region 104 and the couplers 102 and 106 has a substrate 120, a subcladding layer 122 over the substrate 120, a core layer 124 over the subcladding 122, a liquid crystal (LC) layer 126 functioning as a top cladding layer over the core 124, and a cover glass layer 128 over the LC layer 126 that retains and protects the LC layer 126. As shown in FIGS. 1A and 1B, formed within the glass layer 128 on top of the LC layer 126 are horizontal-steering electrodes 130 over the waveguide region 104 and a vertical-steering electrode 132 over the outcoupler 106.

As shown in FIGS. 1A and 1C, all of the layers within the waveguide region 104 have uniform thicknesses. For the couplers 102 and 106, the substrate 120 and the subcladding 122 are both tapered with thicknesses that decrease from the side abutting the waveguide region 104 to the input and output tips 108 and 110, respectively, of the conventional BS device 100, while the core 124 has the same uniform thickness $t_{core}$ throughout the conventional BS device 100.

When deployed in an optical system, light (e.g., laser light) that is incident at the incoupler facet 112 is coupled into the core 124 within the incoupler 102 and traverses along the core 124 through the waveguide region 104 to the outcoupler 106, where the light is emitted from the outcoupler facet 114.

FIGS. 2A and 2B are, respectively, a cross-sectional side view and a perspective top view of the conventional BS device 100 of FIGS. 1A and 1B, indicating variations in the path of outgoing light 204 emitted from the outcoupler 106 as functions of electric fields applied by the horizontal-steering electrodes 130 and the vertical-steering electrode 132. In particular, FIG. 2A indicates the range of variation in the vertical angle $\theta_{vertical}$ for the outgoing light 204 for different voltage levels applied by the vertical-steering electrode 132, while FIG. 2B indicates the range of variation in the horizontal angle $\theta_{horizontal}$ for the outgoing light 204 for different voltage levels applied by the horizontal-steering electrodes 130. Note that, for a static set of voltages applied to the electrodes 130 and 132, incoming light 202 of a single wavelength that successfully couples into the incoupler 102 will be emitted from the conventional BS device 100 at the outcoupler facet 114 as outgoing light 204 in a particular outgoing direction having a vertical angle $\theta_{vertical}$ and a horizontal angle $\theta_{horizontal}$ that are dependent on those voltages. The outgoing light 204 can be steered by selectively varying those voltages to change the vertical and/or horizontal angles of the outgoing direction.

While effective and routinely used, this coupling process has two fundamental limitations. First, the phase-matching conditions created are inherently narrow-band, and they are extremely sensitive to the external angle of the source as it illuminates the incoupler facet 112 of conventional BS device 100. Second, for mid-wave infrared (MWIR) light ($\lambda$=3-5 µm), typical full-width half max (FWHM) bandwidths for waveguides coupled in this manner are ~10-50 nm, with angular acceptance FWHM on the order of 0.1°, depending on the taper angles of the subcladding 122 within the couplers 102 and 106. Generally, these FWHM values will scale proportional to the wavelength of light, such that couplers designed to work with short-wave infrared light ($\lambda$=1.5-3 µm) will have proportionally narrower bandwidths and angular acceptances.

BRIEF DESCRIPTION OF THE DRAWINGS

Embodiments of the invention will become more fully apparent from the following detailed description, the appended claims, and the accompanying drawings in which like reference numerals identify similar or identical elements.

FIGS. 1A and 1B are, respectively, a cross-sectional side view and a perspective top view of a conventional non-mechanical beam-steering (BS) device of the prior art;

FIG. 5A is a graphical representation of the guided power vs. wavelength for an example of the conventional BS device of FIGS. 1A-1C, while

DETAILED DESCRIPTION

Figure 1C:
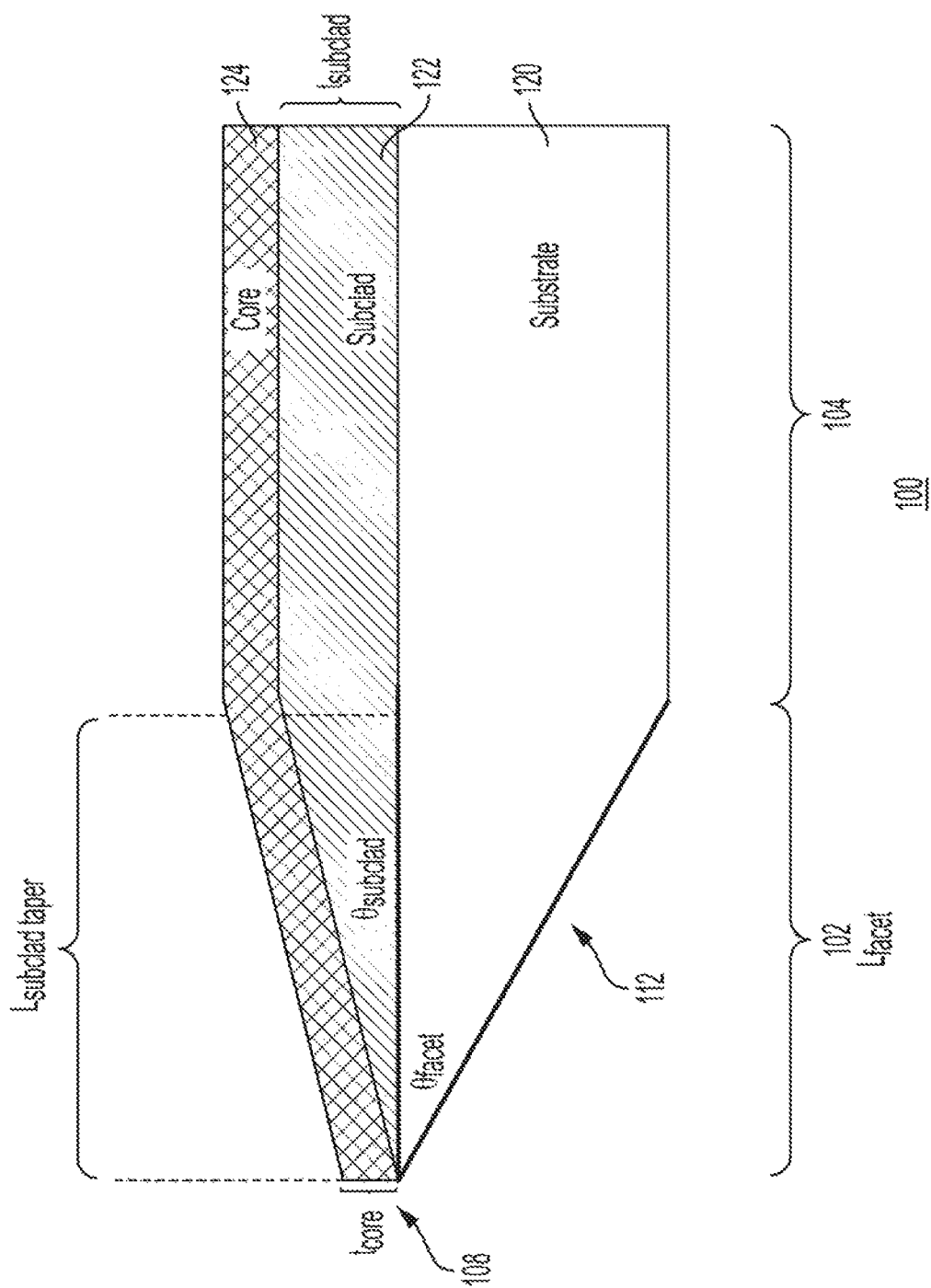
FIG. 1C is a magnified cross-sectional side view of the incoupler and part of the planar waveguide region of the conventional BS device of FIGS. 1A and 1B.
Figure 2A:
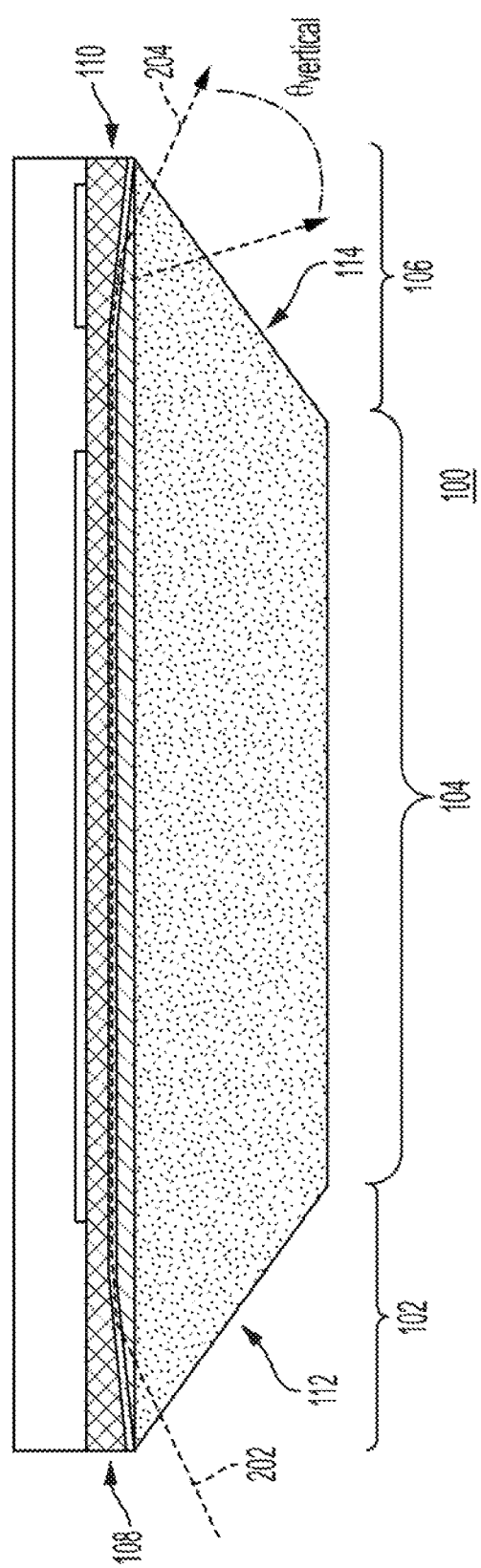
FIGS. 2A and 2B are, respectively, a cross-sectional side view and a perspective top view of the conventional BS device of FIGS. 1A and 1B, indicating variations in the path of outgoing light from the outcoupler as functions of electric fields applied by the device's steering electrodes.
Figure 2B:
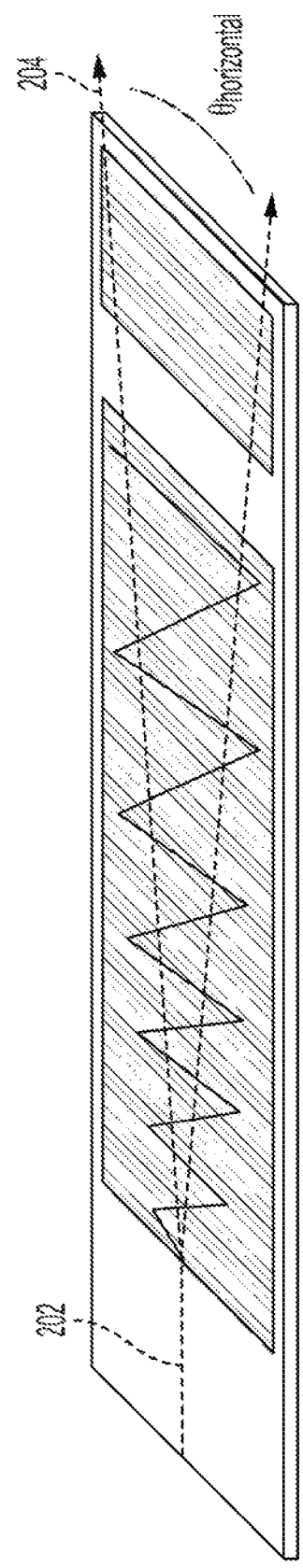

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components.

Broadband Optical Coupler having Multiple Thin-Film Layers with Spatially Varying Optical Thicknesses A new optical coupler has been developed that expands the wavelength acceptance bandwidth and angular acceptance FWHM by, in some embodiments, a factor greater than 10. In some embodiments, the new coupler relies upon spatially structuring multiple thin-film layers of the coupler structure to greatly extend the phase-matching conditions for coupling. By spatially structuring multiple thin-film layers, rather than tapering only the subcladding layer as is done in the conventional BS device 100 of FIGS. 1A-1C, the effective index within a new coupler can be held substantially constant across a broad band of wavelengths, allowing all of those wavelengths to couple into the coupler simultaneously at a substantially identical external angle. Similarly, because the external coupling angle is a function of the effective index, creating a wide region with equal effective indices also greatly increases the coupling angle tolerance (i.e., range of external coupling angles) where the phase-matching condition is satisfied and successful coupling occurs.

This innovation has a number of improvements over the current state-of-the-art. First, the greatly expanded bandwidth makes the new couplers source-agnostic, that is, able to simultaneously accommodate multiple narrow-line sources, tunable sources, or wideband sources such as supercontinuum lasers. Second, the increased angular acceptance greatly relaxes practical challenges in coupling, making the new couplers more robust with regards to manufacturing and assembly tolerances and in-service handling and vibration. NMBS devices fabricated using these new multiple-structured-layer couplers are able to accommodate wide-bandwidth/multi-line sources in a single refractive beam-steering device. With a conventional steerer, multiple steering devices must be used, or the external coupling angle must be changed to accommodate a change in wavelength of the source, practical limitations that impact the adoption of this technology.

Figure 3:
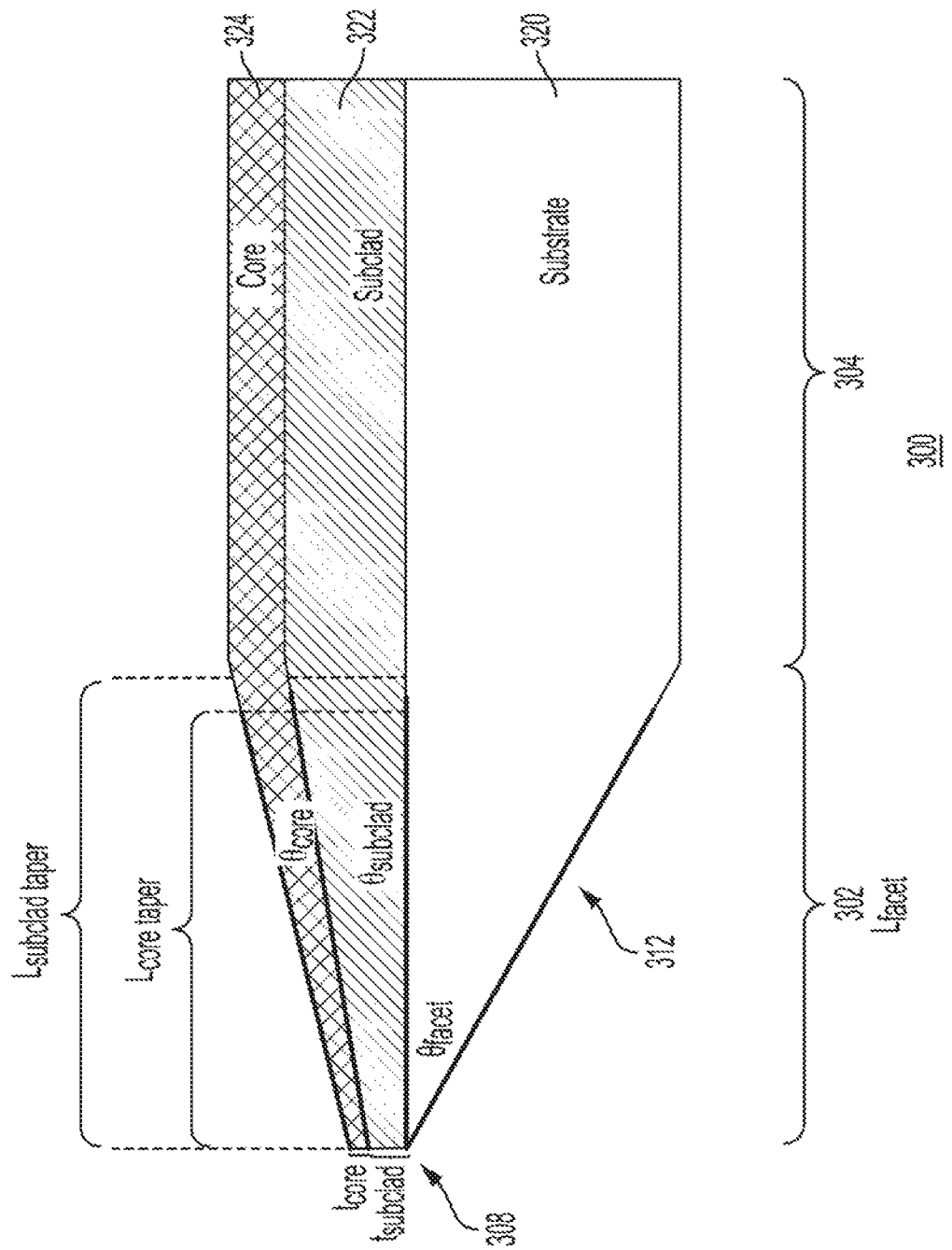
FIG. 3 is a magnified cross-sectional side view of the new incoupler and part of the planar waveguide region of a new BS device.

FIG. 3 is a magnified cross-sectional side view of the new incoupler 302 and part of the planar waveguide region 304 of a new beam-steering device 300. Although not shown in FIG. 3, the new BS device 300 has an outcoupler on the other side of the waveguide region 304 that is analogous to the new incoupler 302 of FIG. 3. Note further that, although not represented in FIG. 3, the new BS device 300 may also have electrodes, a liquid crystal layer, and a glass layer that are analogous to the corresponding elements in the conventional BS device 100 of FIGS. 1A-1C.

Like the substrate 120 of the conventional BS device 100, the substrate 320 of the new BS device 300 is uniform within the waveguide region 304 and tapered (i.e., faceted) within the incoupler 302 with a taper angle $\theta_{facet}$ and a taper length $L_{facet}$ that corresponds to the length of the incoupler 302.

Similarly, like the subcladding layer 122 of the conventional BS device 100, the subcladding layer 322 of the new BS device 300 is uniform within the waveguide region 304 and tapered within the incoupler 302 with a taper angle $\theta_{subclad}$, a taper length $L_{subclad}$, and a thickness $t_{subclad}$ at the input tip 308.

Significantly, however, unlike the core layer 124 of the conventional BS device 100, which is uniform within both the waveguide region 104 and the incoupler 102, in the new BS device 300 of FIG. 3, the core layer 324 is uniform within the waveguide region 304, but tapered within the incoupler 302 with a taper angle $\theta_{core}$, a taper length $L_{core}$, and a thickness $t_{core}$ at the input tip 308.

Note that the dimensions in FIG. 3 are not drawn to scale. In typical implementations, the substrate 320 is about a thousand times thicker than the combined thickness of the subcladding and core layers 322 and 324. Furthermore, although FIG. 3 shows the substrate 320 having zero thickness $t_{facet}$ at the input tip 308, in typical implementations, the substrate will have a non-zero thickness $t_{facet}$ at the input tip 308.

Although not shown in FIG. 3, within the outcoupler of the new BS device 300, the substrate 320, the subcladding 322, and the core 324 are also tapered with one or more taper angles, taper lengths, and/or tip thicknesses possibly, but not necessarily, being different from the corresponding dimensions of the corresponding layers within the incoupler 302 of FIG. 3.

In the embodiment shown in FIG. 3, the subcladding 322 is formed with a linear taper profile directly on top of the substrate 320, and the core 324 is formed with a linear taper profile directly on top of the subcladding 322. In other embodiments, the subcladding 322 and/or the core 324 may have a nonlinear taper profile. As shown in FIG. 3, the taper lengths $L_{facet}$, $L_{subclad}$, and $L_{core}$, can be, but do not have to be, different from each other.

Furthermore, one or more of the taper angles $\theta_{facet}$, $\theta_{subclad}$, and $\theta_{core}$, the taper lengths $L_{facet}$, $L_{subclad}$, and $L_{core}$, and the tip thicknesses $t_{facet}$, $t_{subclad}$, and $t_{core}$ can be different in different instances of the new BS device 300 to achieve different coupling behavior and waveguide properties.

In operation, collimated or near-collimated light is coupled into the new BS device 300 through the substrate facet 312. Optimum parameters for the input coupling may be determined by modelling the structure. These parameters may include position along the incoupler facet 312, beam diameter, radius of curvature of the beamfront, and coupling angle. Light is coupled into the core 324 through the subcladding 322, and the higher refractive index of the core 324 relative to the subcladding 322 results in waveguiding in the core 324. The spatially varying thickness of the core 324 results in a spatially varying effective index for the fundamental mode of the incoupler 302, thus permitting phase matching to occur for a larger range of wavelengths to satisfy the phase-matching condition for a fixed input coupling angle in comparison with an Ulrich coupler without a tapered core, such as the Ulrich coupler 102 of FIGS. 1A-1C.

In example implementations of the new BS device 300 of FIG. 3, a 3 mm-thick flat silicon substrate 320 is (i) faceted on two ends, e.g., at a 39° taper angle $\theta_{facet}$, by mechanical grinding and (ii) polishing and cleaned by subsequent sonications in surfactant solution, deionized water, acetone, and isopropanol. The substrate 320 is placed in a vacuum oven to completely dry. The substrate's taper angle $\theta_{facet}$ is not critical and is dependent on the wavelength and coupler structure.

The subcladding and core layers 322 and 324 are then deposited by high-vacuum thermal evaporation on top of the silicon substrate 320 to create the device structure of FIG. 3. In one example implementation, the subcladding 322 is made of $As_2S_3$. Within the incoupler 302, the taper is grown in the subcladding 322 having a taper angle $\theta_{subclad}$ on the order of 250-1500 μrad. The taper is grown using an offset shadow mask with a suitable substrate-mask separation of, for example, about 1 cm. Within the non-coupling planar waveguide region 304, the subcladding 322 is grown sufficiently thick to ensure that that the optical mode is isolated from the silicon substrate 320.

After subcladding deposition, the device is removed from the chamber, and a different shadow mask is used to grow a tapered core 324 of a suitable material, for example, $As_2Se_3$. The taper angle $\theta_{core}$ is on the order of 50-500 μrad, and the substrate-mask separation is about 1.5 cm. The incoupler 302 is defined by the overlap between the tapered regions of the core 324 and the subcladding 322, constraining the lateral placements of the shadow masks relative to the tip 308 of the faceted substrate 320. In practice, the overlap region is designed to be approximately the size of the laser beam spot. The taper angles of each layer are not necessarily identical and can be independently adjusted to impact the coupling behavior, but, in practice, the taper angle $\theta_{core}$ of the core 324 will be less than the taper angle $\theta_{subclad}$ of the subcladding 322 due to the larger refractive index of the core. Further, the taper angles are not necessarily symmetrical at the incoupler and outcoupler of the new BS device 300 and may be adjusted to impact such parameters as dispersion of the outcoupled beam, mode confinement in the core 324, and output angle.

In one example implementation of the new BS device 300, the taper angle $\theta_{subclad}$ of the subcladding 322 is about 500 μrad, and the taper angle $\theta_{core}$ of the core 324 is about 160 μrad, with subcladding and core thicknesses $t_{subclad}$ and $t_{core}$ of about 2 μm and about 1 μm, respectively, at the tip 308 of the new BS device 300. Within a spot size of about 1.4 mm, simulations of incoupling in this example new BS device 300 show a constant effective index and constant coupling angle over an about 1 μm bandwidth, with the optimum coupling spot (the spot at which phase matching occurs for a particular wavelength) shifting monotonically with wavelength from the tip 308 to the edge of the spot. Therefore, within the entirety of the spot, wavelengths with a bandwidth of about 1 μm should be coupled.

Figure 4A:
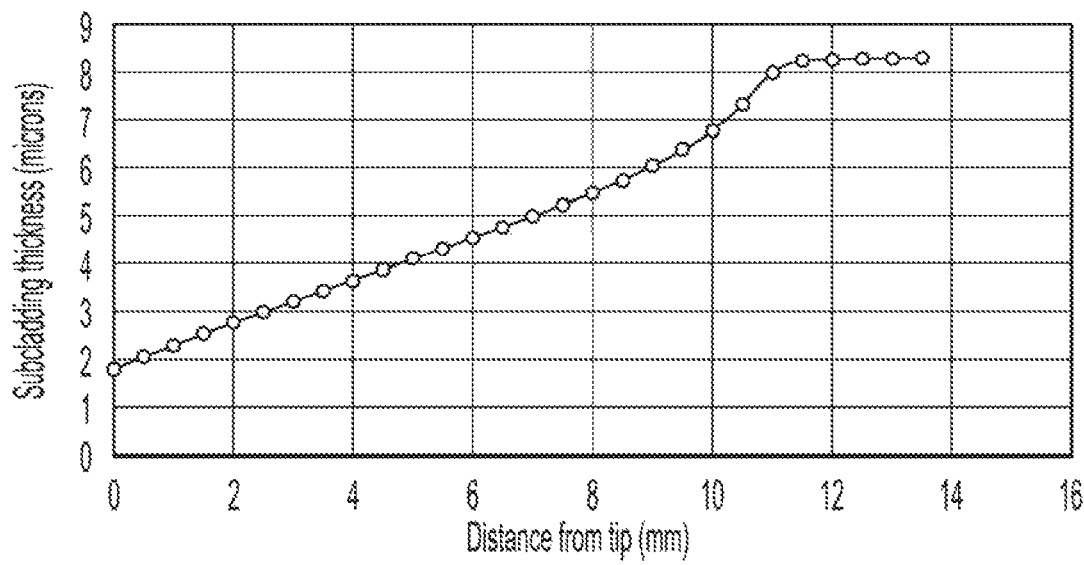
FIGS. 4A and 4B are graphical representations of the layer thicknesses as functions of distance from the tip for the subcladding and the core, respectively, for an example of the new incoupler of FIG. 3.
Figure 4B:
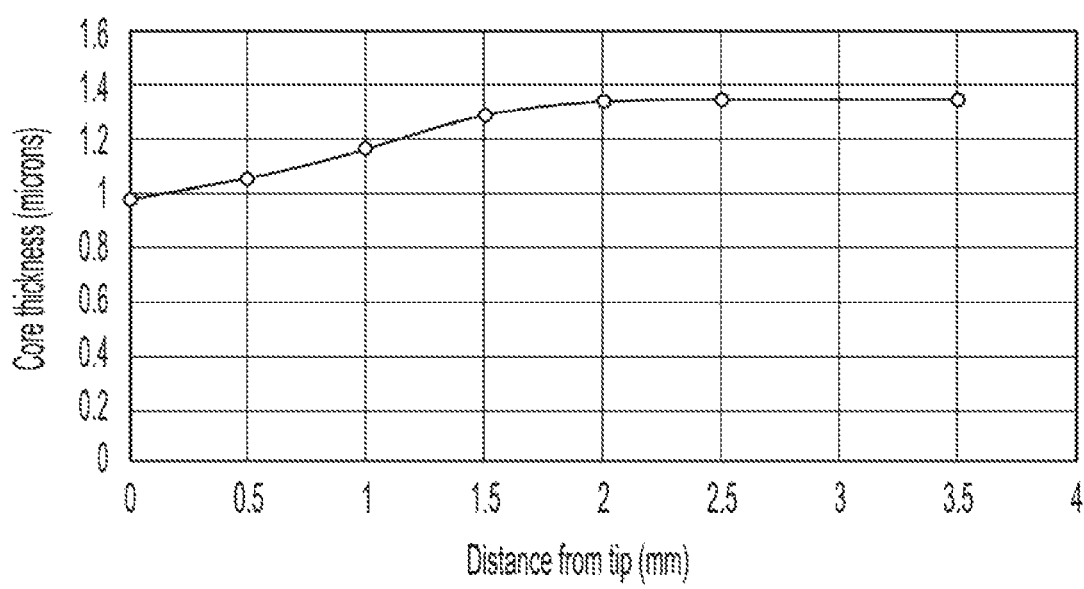

FIGS. 4A and 4B are graphical representations of the layer thicknesses as functions of distance from the tip 308 for the subcladding 322 and the core 324, respectively, for an example of the new incoupler 302 of FIG. 3. These figures demonstrate the substantial linearity of the taper profiles of these layers for the example new incoupler 302.

After fabrication, the example new BS device 300 was removed from the chamber and characterized using a broadband, multi quantum cascade laser (QCL) source that is continuously tunable between 3.6 μm and 4.7 μm, while guided power was measured using an integrating sphere and MWIR detector positioned to catch the outcoupled beam. An example conventional BS device 100 of FIGS. 1A-1C, having a substrate 120 and subcladding 122 identical to the substrate 320 and subcladding 322 of the example new BS device 300, but with a non-tapered core 124, was also fabricated and characterized for comparison.

Figure 5A:
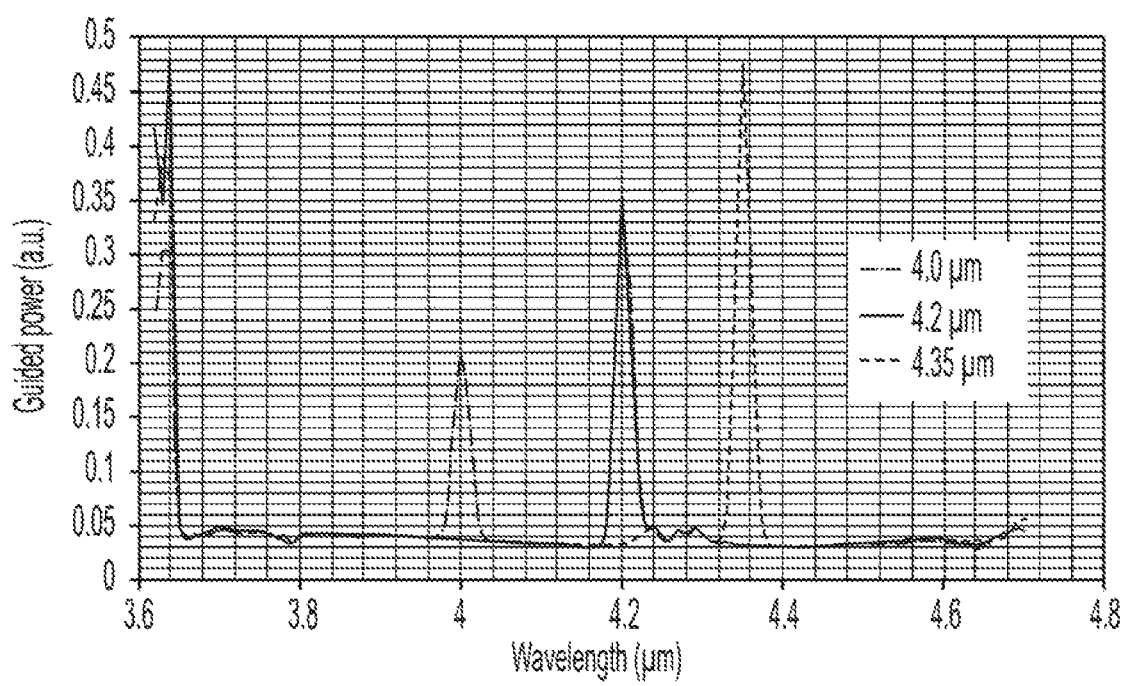
Figure 5B:
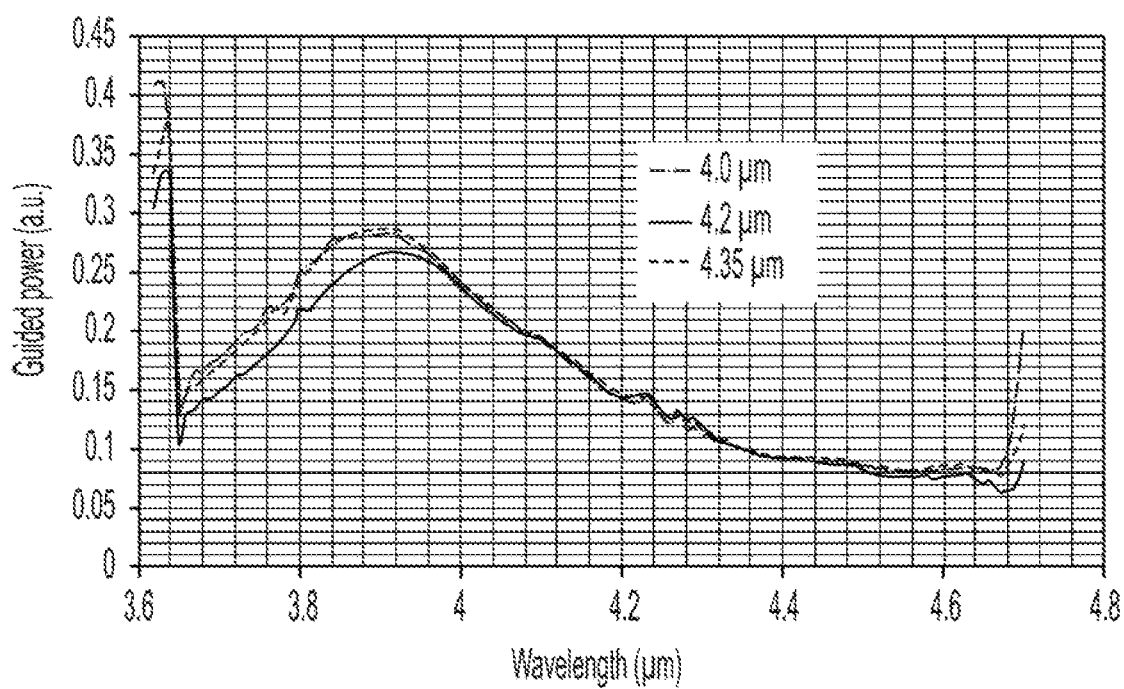
FIG. 5B is a graphical representation of the guided power vs. wavelength for an example of the new BS device of FIG. 3 having the example incoupler of FIGS. 4A and 4B.

FIG. 5A is a graphical representation of the guided power vs. wavelength for an example of the conventional BS device 100 of FIGS. 1A-1C, while FIG. 5B is a graphical representation of the guided power vs. wavelength for the example of the new BS device 300 of FIG. 3 having the example incoupler 302 of FIGS. 4A and 4B. Each curve represents the guided power (Y axis) as a function of the wavelength of the incoming light (X axis) for the optimal coupling angle that corresponds to a different wavelength. For example, the curve labeled 4.0 μm in FIG. 5A represents the amount of light that is measured coming out of the outcoupler 106 of the example conventional BS device 100 for different wavelengths of incoming light that is applied at the conventional Ulrich incoupler 102 at the optimal angle of incidence for light having a wavelength of 4.0 μm. Similarly, the curve labeled 4.0 μm in FIG. 5B represents the amount of light that is measured coming out of the outcoupler of the example new BS device 300 for different wavelengths of incoming light that is applied at the new incoupler 302 at the optimal angle of incidence for light having a wavelength of 4.0 μm. As shown in FIG. 5A, in the example conventional BS device 100 having a non-tapered core 124 within the conventional Ulrich incoupler 102, optimization of coupling at different wavelengths results in shifting of the transmitted spectrum to a narrow band around the optimized wavelength. On the other hand, as shown in FIG. 5B, in the example new BS device 300 having a tapered core 324 within the new incoupler 302, optimization at different wavelengths results in essentially no change in the guided spectrum. The broadband, broad-angle coupling behavior of the new incoupler 302 shows that there is little difference in throughput as the coupling angle is varied as compared to the narrowband, narrow-angle coupling behavior of the conventional Ulrich incoupler 102.

Figure 6:
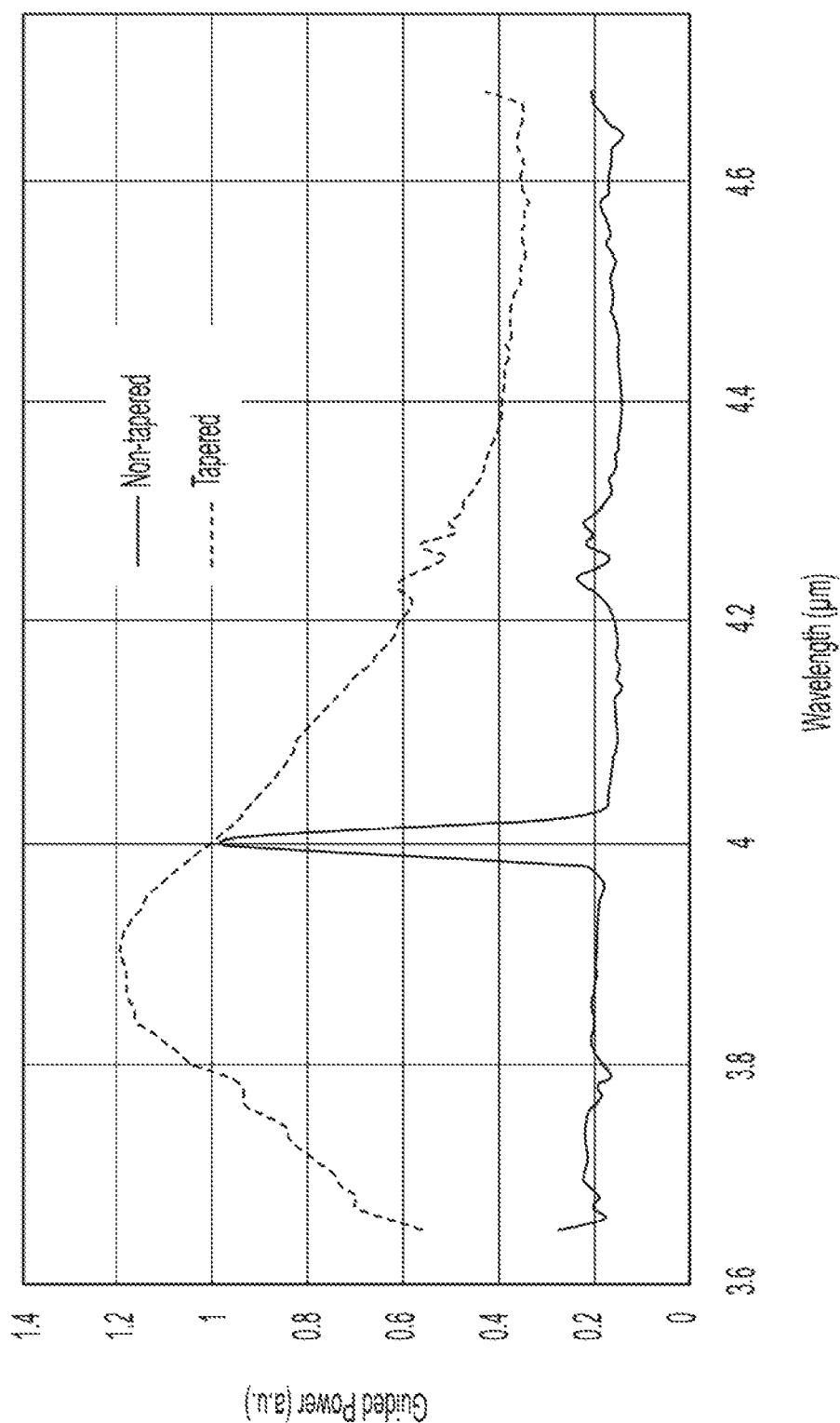
FIG. 6 is a graphical representation of the guided power vs. wavelength for the example conventional BS device of FIG. 5A and the example new BS device of FIG. 5B.

FIG. 6 is a graphical representation of the guided power vs. wavelength for the example conventional BS device 100 of FIG. 5A and the example new BS device 300 of FIG. 3. FIG. 6 presents a comparison of the two guided spectra, where the coupling angle was fixed for optimized throughput at 4.0 μm, and the data was normalized to the guided power at 4.0 μm. At that fixed coupling angle, coupling is observed to occur over a significantly broader wavelength region in the tapered core 324 of the example new incoupler 302 compared to the non-tapered core 124 of the example conventional Ulrich coupler 102. In particular, the example conventional Ulrich coupler 102 had a full-width, half-maximum (FWHM) bandwidth of 30 nm and a FWHM coupling angle tolerance of 0.2 degrees, while the example new coupler 302 had a FWHM bandwidth of 600 nm and a FWHM coupling angle tolerance of 3.9 degrees or about 20-fold increases in performance.

The new and conventional BS devices 300 and 100 with and without tapered cores, respectively, were fabricated using techniques described in Frantz, et al., "Chalcogenide Glass Waveguides for Refractive Non-Mechanical Beam Steerer," U.S. patent application Ser. No. 15/946,011 ("the '011 application"), filed Apr. 5, 2018, the teachings of which are incorporated herein by reference. The waveguide core was brushed to serve as a liquid crystal alignment surface, and a liquid crystal cell was fabricated on top of the waveguide using a liquid crystal with low MWIR absorption. The top of the liquid crystal cell was formed by a piece of quartz coated with indium tin oxide (ITO). The ITO was patterned with a prismatic electrode pattern to create the steering elements. The BS devices with tapered and non-tapered cores exhibited the same coupling behaviors as the corresponding bare incouplers (i.e., thin-film couplers without the LC layers, cover glass layers, and electrodes) while simultaneously undergoing active steering.

Embodiments of the new optical coupler 302 may provide one or more of the following advantages:

The new couplers may have a significantly increased bandwidth compared to conventional Ulrich couplers, making them suitable for a wide range of laser sources that do not have narrow linewidths, such as supercontinuum and multi-line sources.

The new couplers may have a significantly increased angular acceptance range compared to conventional Ulrich couplers, allowing them to support a more-robust method for coupling that is insensitive to in-service vibration and manufacturing error in system assembly.

The new couplers may allow for simultaneous coupling, at either identical or different angles, of multiple narrow-line or broadband laser sources.

Although the subcladding layer 322 and the core layer 324 are tapered in both the incoupler and the outcoupler of the new BS device 300 of FIG. 3, in alternative embodiments, the subcladding layer and/or the core layer might be tapered in only one of those couplers.

The idea of having the tapered core 324 in the new optical coupler 302 of FIG. 3 can also be applied in prism-coupled waveguides, where the guiding core is tapered in the coupling region to achieve the same effect, with a tapered air gap providing the second taper instead of the tapered subcladding layer 322.

In the embodiments of the new BS device described above, broadband coupling is achieved via spatial control of the effective index within the incoupler by tapering the core. In alternative embodiments, spatial control of the effective index can be achieved by techniques other than tapering the core. For example, other layers may be tapered, such as the top cladding, the substrate, or other incoupling layers that exist only within the incoupler (e.g., an incoupling layer between the subcladding and the core), either in addition to or instead of the core. In general, the tapering of any given layer may be linear or non-linear, independent of the tapering of any other layers, to spatially control the effective index of the incoupler.

Additional methods of providing a spatially controlled effective index may be used, including but not limited to spatially varying the composition and refractive index of the core and/or the subcladding (e.g., $As_2(S_xSe_y)$ deposited via gradient techniques or through selective diffusion, where x and y vary across the incoupler), sub-wavelength effective medium structures, thermal gradients, and electro-optic effects (e.g., liquid crystal with fine-spaced tuning electrodes that have different voltages applied to them).

In general, the new couplers have two or more thin-film layers (e.g., subcladding, core, and/or top cladding) with spatially varying optical thicknesses, where optical thickness refers to the product of the thickness of a layer and the layer's refractive index. In the new BS device 300 of FIG. 3, the subcladding layer 322 and the core layer 324 have spatially varying optical thicknesses due to their respective tapered layer thicknesses. Those skilled in the art will understand that a layer having spatially varying optical thickness can be achieved by spatially varying the refractive index of the layer (with or without spatially varying the layer thickness) using one or more of the techniques suggested in the previous paragraph. Further, those skilled in the art will understand that effective index of a conventional planar waveguide is related to the optical thicknesses of its constituent layers.

As described previously, the new couplers have full-width, half-maximum (FWHM) bandwidths and FWHM coupling angle tolerances that exceed those of conventional Ulrich couplers. In some embodiments of the new couplers, the FWHM bandwidths are greater than 60 nm and the FWHM coupling angle tolerances are greater than 0.4 degrees. In some embodiments of the new couplers, the FWHM bandwidths are greater than 150 nm and the FWHM coupling angle tolerances are greater than 1 degree. In some embodiments of the new couplers, the FWHM bandwidths are greater than 300 nm and the FWHM coupling angle tolerances are greater than 2 degrees. In some embodiments of the new couplers, the FWHM bandwidths are about 600 nm and the FWHM coupling angle tolerances are about 4 degrees.

Technique for Actively Controlling the Incouple of an Optical Coupler

A new coupling technique relies on active tuning of the effective index within the incoupler of a beam-steering device using the variable index of liquid crystal and a feedback loop to maximize guided power. Because the effective index within the incoupler is based on the refractive indices of all layers (e.g., the core, the subcladding, and the liquid crystal top cladding), the phase-matching condition for coupling, which depends strongly on effective index, can be tuned by applying an electric field to adjust the refractive index of the LC layer taking advantage of the birefringence of the liquid crystal. This change in the refractive index of the LC layer changes the effective index of the incoupler as a whole. Typically, the refractive index of liquid crystal can be varied from about 1.5 to about 1.7, though these values are dependent upon the exact composition of the liquid crystal mixture. At a fixed wavelength in a typical incoupler structure that is part of an MWIR SEEOR, this variation translates into a change in the effective index ($\Delta n_{eff}$) of about 0.01. While small in absolute magnitude, this change in effective index can have a very large impact on the coupling behavior due to the sensitivity of coupling to the resonant phase-matching condition.

The change in effective index can be used for a variety of effects when coupling light into the incoupler of a BS device. The change can compensate for vibration or manufacturing errors, by dynamically tuning the effective index to compensate for variations in coupling angle. The change can also accommodate wavelength instability of a source laser by changing the effective index to reestablish the phase-matching condition at a different wavelength. The concept of active effective index tuning addresses a number of issues with conventional SEEOR technology (e.g., its sensitivity to coupling angle and narrow-line sources) as well as enabling new capabilities that will be important for different applications.

Figure 7:
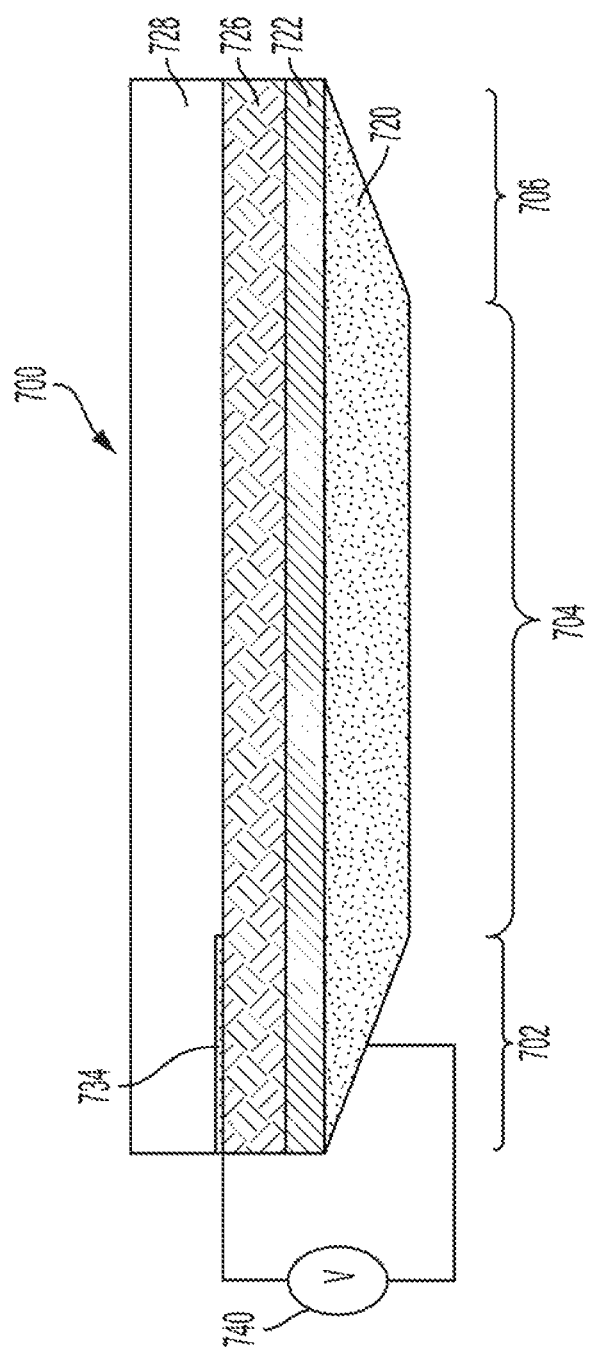
FIG. 7 is a cross-sectional side view of a BS device having a planar waveguide region between a tapered incoupler and a tapered outcoupler.

FIG. 7 is a cross-sectional side view of a BS device 700 having a planar waveguide region 704 between a tapered incoupler 702 and a tapered outcoupler 706. All three regions have a substrate 720, a number of thin-film waveguide layers 722 (e.g., a subcladding layer and a core layer) over the substrate 720, a liquid crystal (LC) layer 726 over the waveguide layers 722, and a cover glass layer 728 over the LC layer 726. Formed within the glass layer 728 on top of the LC layer 726 is an incoupler electrode 734 corresponding to the incoupler 702. Although not shown in FIG. 7, there may also be (i) horizontal-steering electrodes formed within the glass layer 728 on top of the LC layer 726 corresponding to the waveguide region 704 and/or (ii) a vertical-steering electrode formed within the glass layer 728 on top of the LC layer 726 corresponding to the outcoupler 706 that are analogous to the electrodes in the conventional BS device 100 of FIGS. 1A-1C. Depending on the implementation, the BS device 700 may be a conventional BS device similar to the conventional BS device 100 of FIGS. 1A-1C, a new BS device similar to the new BS device 300 of FIG. 3, or any other suitable type of BS device.

Using the techniques described in the '011 application, the BS device 700 may be fabricated on a faceted silicon substrate 720 with a subclad layer of $As_2S_3$ and a core of $As_2Se_3$ (collectively labeled 722 in FIG. 7). Both layers are grown via high-vacuum thermal evaporation, for example. After waveguide fabrication, a liquid crystal cell is constructed on top of the core and filled with an MWIR-transparent liquid crystal mixture to form the LC layer 726. The cell gap is 5 μm and, due to the taper of the subclad layer, the cell gap varies across the incoupler 702. The tapered cell gap is a function of the cell geometry and is not critical to the function of the effective index tuning mechanism.

The top of the cell (i.e., glass layer 728) is composed of quartz with a patterned indium-tin oxide (ITO) layer forming the incoupler electrode 734. There is an ITO contact pad above the incoupler 702. This contact pad serves to tune the effective index in the incoupler 702. The Si substrate 720 serves as the bottom contact for the liquid crystal cell. In this example, the incoupler electrode 734 over the incoupler 702 is a solid rectangular bar, but the electrode is not required to be this shape. The quartz 728 and ITO electrode 734 cover the entire incoupler 702, from the tip of the incoupler facet to beyond the faceted portion of the substrate 720.

As shown in FIG. 7, the incoupler 702 is connected to a voltage supply 740 that is configured to apply a voltage to the incoupler electrode 734 to generate an electric field across the incoupler 702. Due to the field-dependent optical birefringence in the LC layer 726, the magnitude of the electric field applied across the incoupler 702 affects the wavelength and/or the angle of incidence at which incoming light optimally couples into the incoupler 702. For example, modifying the magnitude of the applied electric field changes the wavelength of incoming light that can be optimally coupled into the incoupler 702 at a given angle of incidence. Alternatively, modifying the magnitude of the applied electric field changes the optimal coupling angle for incoming light of a given wavelength into the incoupler 702. Alternatively still, for incoming light of a given wavelength and a given angle of incidence into the incoupler 702, modifying the magnitude of the applied electric field changes the intensity of the outgoing light emitted from the outcoupler 706 of the BS device 700.

To demonstrate wavelength agility, an example of the BS device 700 was mounted on a rotational stage with the incoupler facet mounted at the center of rotation. Light from a tunable, fiber-coupled quantum cascade laser (QCL) was used to illuminate the incoupler facet with a spot size of about 1 mm. The guided power through the BS device 700 was measured using an integrating sphere with an MWIR photodetector mounted about 5 cm from the outcoupler facet. The BS device 700 was aligned such that efficient coupling was achieved at 4.5 μm, and a wavelength sweep was performed. The voltage on the incoupler electrode 734 was then increased, and another wavelength sweep was performed, and so on.

Figure 8:
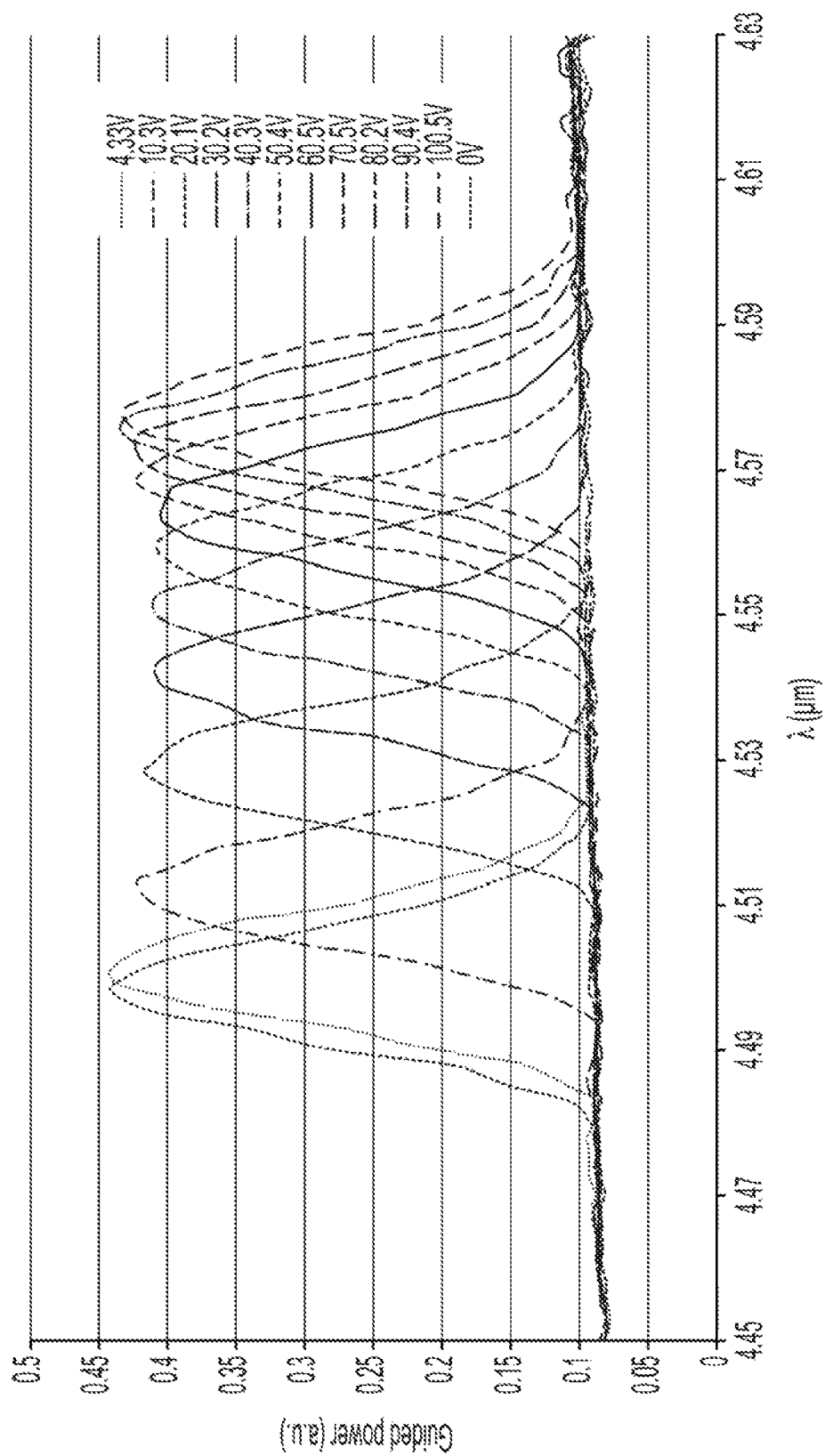
FIG. 8 presents graphical representations of the resulting relative guided power through an example of the BS device of FIG. 7 for different applied electric fields.

FIG. 8 presents graphical representations of the resulting relative guided power through an example of the BS device 700 of FIG. 7 for different applied electric fields. Each curve represents the relative guided power through the BS device 700 for a given electric field as the wavelength of the incoming light was swept between about 4.45 microns and 4.63 microns. Each increase in voltage applied to the incoupler electrode 734 resulted in a shift in the peak-power wavelength $\lambda_{peak}$ with a total shift in $\Delta\lambda_{peak}$ of about 80 nm over the different voltage levels. As demonstrated in FIG. 8, for a given angle of incidence, the frequency of the incoming light for optimal coupling varies with the magnitude of the applied electric field. Removing the voltage and adjusting the coupling angle to correspond to maximum power at 4.578 μm ($\lambda_{peak}$ @ 100V driving voltage) required an adjustment of about 0.5° in the external coupling angle, indicating that this method of incoupling adjustment also compensates for variations in coupling angle.

The electric-field-dependent incoupling characteristics of the BS device 700 of FIG. 7 can be exploited in a number of different applications.

Figure 9:
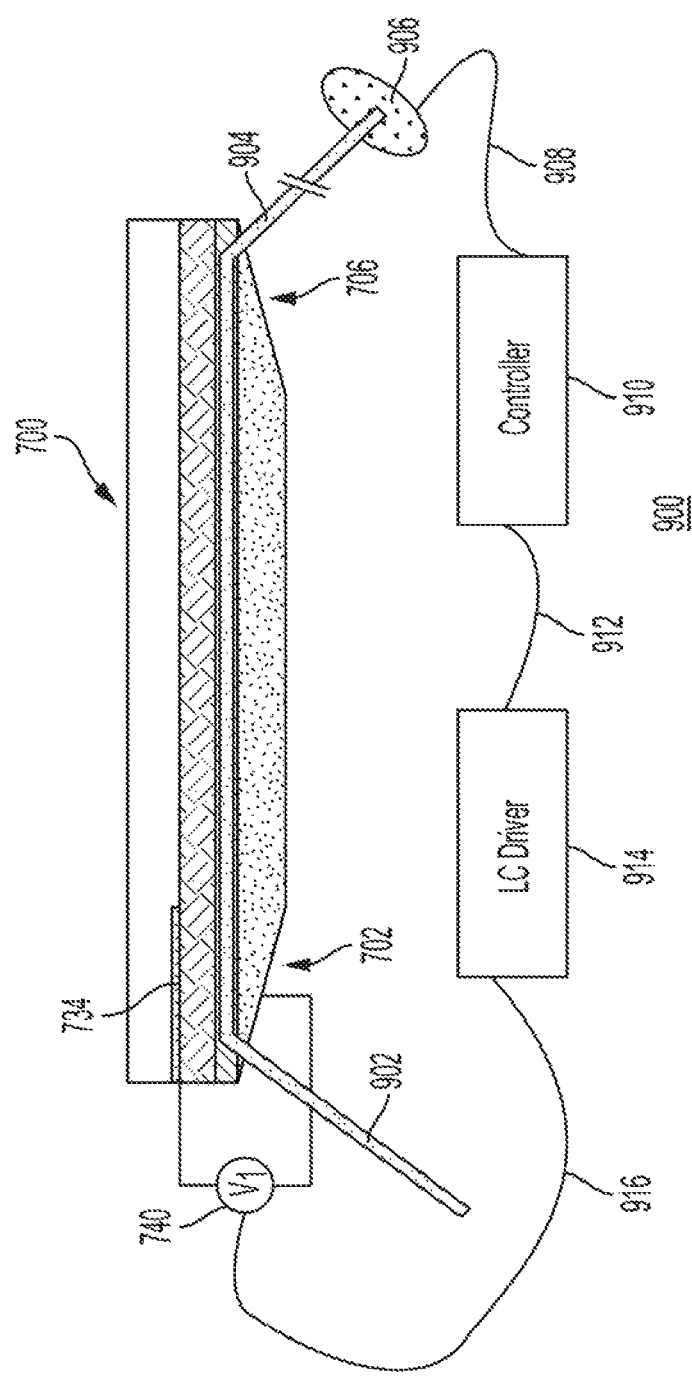
FIG. 9 is a schematic block diagram of an optical system that actively controls the operations of the BS device of FIG. 7 by modifying the electric field applied at the BS device's incoupler.

FIG. 9 is a schematic block diagram of an optical system 900 that actively controls the operations of the BS device 700 of FIG. 7 by modifying the electric field applied at the incoupler 702. In addition to the BS device 700 and the voltage supply 740, the optical system 900 includes a photodetector 906, a controller 910, and an LC driver 914.

In operation, incoming light 902 from a light source (not shown) is coupled into the BS device 700 at the incoupler 702 and corresponding outgoing light 904 is emitted from the BS device 700 at the outcoupler 706. The photodetector 906 converts the received outgoing light 904 into an electrical detector signal 908 that is monitored by the controller 910. The controller 910 transmits a driver-control signal 912 to instruct the LC driver 914 to generate a voltage-control signal 916 that drives the voltage supply 740 to apply a corresponding voltage to the incoupler electrode 734 to apply a corresponding electric field across the incoupler 702 that affects the incoupling characteristics of the BS device 700.

In one implementation, the optical system 900 is operated to encode data into the outgoing light 904. In particular, for incoming light 902 of a suitable wavelength and a suitable angle of incidence, by selectively varying the electric field applied across the incoupler 702, the controller 910 is able to modulate the intensity of the outgoing light 904, where, for example, a logic 1 is represented by outgoing light 904 above a specified intensity and a logic 0 is represented by outgoing light 904 below that specified intensity. In this implementation, the optical system 900 can function as a transmitter in an optical communication system transmitting the modulated outgoing light 904 encoding data to a remote receiver.

Furthermore, the optical system 900 can be used to actively compensate for errors (e.g., due to mechanical misalignment) and/or temporal variations (e.g., due to source drift or vibration) in the wavelength and/or the angle of incidence of the incoming light 902. In particular, if the current wavelength of the incoming light 902 is not sufficiently matched for the current angle of incidence of the incoming light 902, then the magnitude of the applied electric field can be adjusted to improve that matching. Such improved matching can be achieved by modifying the magnitude of the electric field applied across the incoupler 702 to increase the magnitude of the detected outgoing light 904 at the photodetector 906. By monitoring the detector signal 908, the controller 910 can perform an appropriate search algorithm to find the voltage level that tunes the optical system 900 as needed.

The optical system 900 can also be used to achieve source multiplexing. The fast response of the liquid crystal input tuning allows for time-division multiplexing of multiple sources through a common BS device 700, operating either at a common input angle or different input angles. For example, two or more lasers operated at different wavelengths could simultaneously shine their light beams on the incoupler facet of the BS device 700, either at the same input angle or different input angles, depending on the lasers and the design of the BS device 700. The controller 910 can control the electric field applied by the incoupler electrode 734 to selectively tune the coupling behavior of the incoupler 702 to allow only one of the wavelengths to couple into the BS device 700. Conventional time-division optical multiplexing requires either turning on and off the light sources or providing additional optical elements (e.g., modulators, beam blanks, shutters, etc.) to selectively block light from all but the desired source. In the optical system 900, the multiplexing function is performed by the BS device 700 itself.

As described above, the optical system 900 can address two major issues with conventional SEEORs: (i) they operate at a fixed wavelength and (ii) they are extremely sensitive to errors in coupling.

Although the BS device 700 has been described as having a single, monolithic incoupler electrode 734 above the incoupler 702, in other embodiments, the incoupler electrode 734 can be subdivided into smaller individual electrodes for greater spatial control of the tuning effect. The voltage to each of these electrodes may be controlled independently.

Although, in system 900, the controller 910 controls the electric field applied across the incoupler 702, in alternative embodiments, the controller 910 can control the source of the incoming light 902 to vary the wavelength and/or the angle of incidence of the incoming light 902 instead of or in addition to controlling the electric field.

Wavelength-Based Steering of Non-Mechanical Beam-Steering Devices

Figure 10:
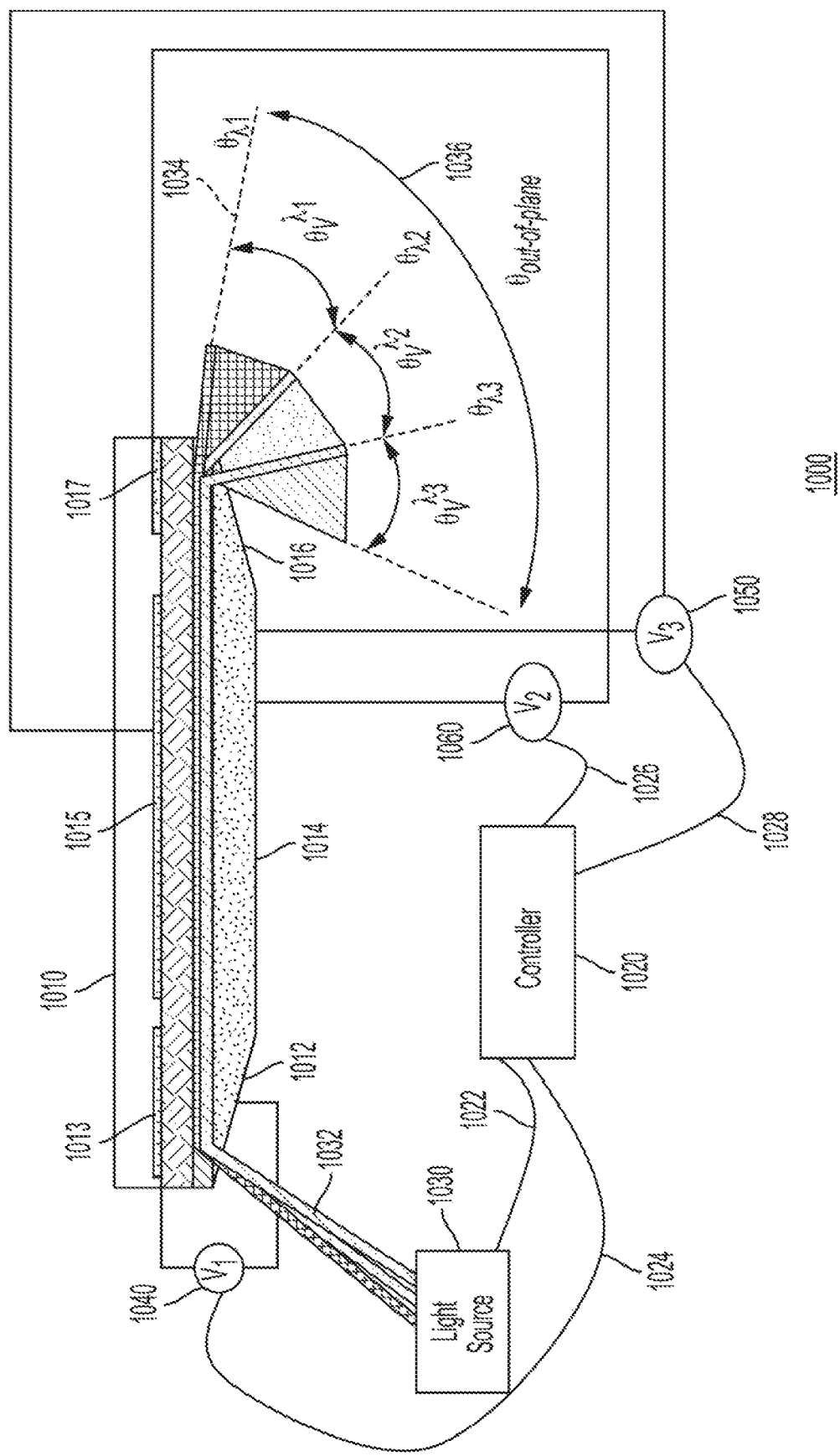
FIG. 10 is a schematic block diagram of an optical system that controls the operations of a non-mechanical BS device by actively controlling the wavelength of the incoming light.

FIG. 10 is a schematic block diagram of an optical system 1000 that controls the operations of a non-mechanical BS device 1010 by actively controlling the wavelength of the incoming light 1032 incident on the incoupler 1012 of the BS device 1010 at a given incidence angle. In addition, the electric fields applied to the incoupler 1012, the planar waveguide region 1014, and/or the outcoupler 1016 of the BS device 1010 may also be modified to control the operations of the BS device 1010. Depending on the implementation, the BS device 1010 may be a conventional BS device, such as the conventional BS device 100 of FIGS. 1A-1C; a new BS device, such as the new BS device 300 of FIG. 3; or any other suitable NMBS device.

In addition to the BS device 1010, the optical system 1000 has a controller 1020, a controllable light source 1030, and three controllable voltage supplies 1040, 1050, and 1060, which are respectively connected to apply (i) a voltage $V_1$ to the incoupler electrode 1013, (ii) a voltage $V_2$ to the horizontal-steering waveguide electrodes 1015, and (iii) a voltage $V_3$ to the vertical-steering outcoupler electrode 1017.

In operation, the controller 1020 uses wavelength-control signal 1022 to control the wavelength of the (collimated or near-collimated) incoming light 1032 generated by the light source 1030 (e.g., a suitable tunable light source such as a tunable, fiber-coupled quantum cascade laser). Optimum parameters for the input coupling may be determined by modeling the structure. These parameters may include position along the facet, beam diameter, radius of curvature of the beamfront, and coupling angle. Light is coupled into the core through the subcladding, and the higher refractive index of the core relative to the sub-cladding results in waveguiding in the core.

In the particular implementation shown in FIG. 10, the controller 1020 can selectively configure the light source 1030 to generate incoming light 1032 of any one of three different wavelengths $\lambda_1$, $\lambda_2$, and $\lambda_3$. Due to the optical characteristics of the BS device 1010, outgoing light 1034 of those three different wavelengths will be respectively emitted from the device outcoupler 1016 at three different characteristic output angles, respectively labeled $\theta_{\lambda 1}$, $\theta_{\lambda 2}$, and $\theta_{\lambda 3}$ in FIG. 10.

Furthermore, the controller 1020 can use the voltage-control signal 1026 to modify the voltage $V_2$ applied by the voltage supply 1060 to the outcoupler electrode 1017 to modify the electric field applied at the outcoupler 1016 and thereby modify the respective output angles for the three different wavelengths over three different, contiguous, voltage-controlled ranges of output angles, respectively labeled $\theta_V^{\lambda 1}$, $\theta_V^{\lambda 2}$, and $\theta_V^{\lambda 3}$ in FIG. 10. In this way, the optical system 1000 can be operated to provide contiguous coverage in the out-of-plane direction over a relatively wide field of regard 1036.

Note that, in some implementations, a similar or analogous contiguous field of regard 1036 may be achieved using a continuously tunable light source 1030 without needing to modify the electric field applied at the outcoupler 1016.

Figure 11:
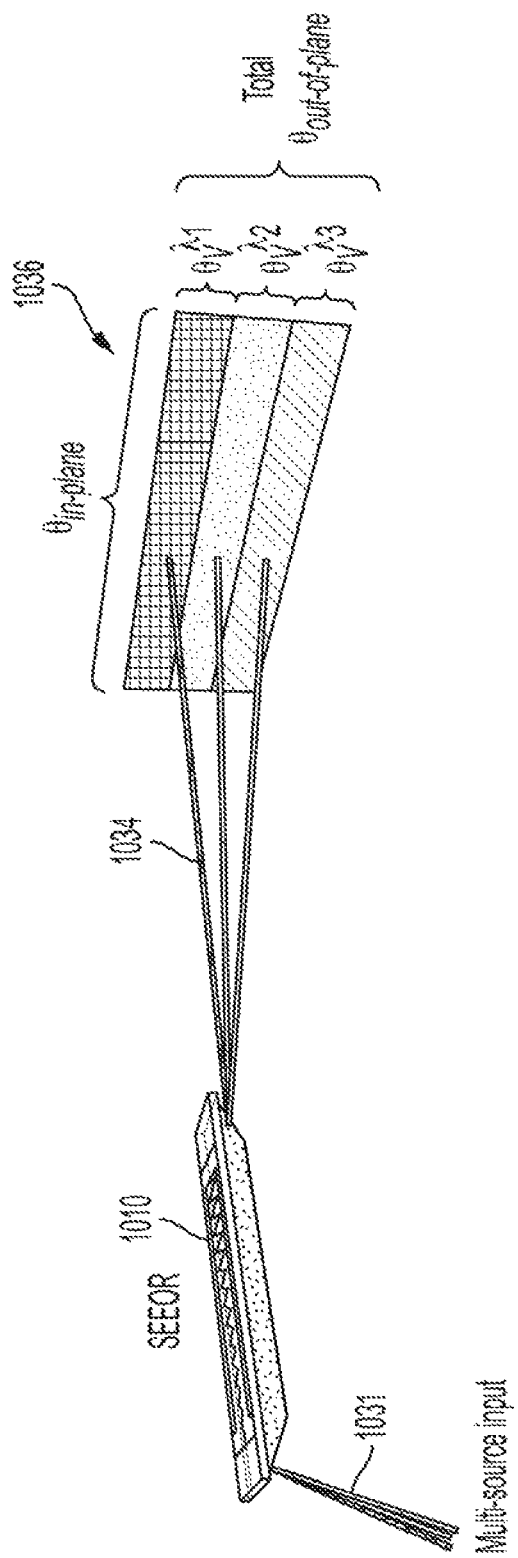
FIG. 11 shows a perspective view of the BS device of FIG. 10 and a two-dimensional representation of the device's field of regard.

FIG. 11 shows a perspective view of the BS device 1010 of FIG. 10 and a two-dimensional representation of the field of regard 1036. As represented in FIG. 11, in addition to controlling the voltage supply 1060 to selectively control the out-of-plane angle of the outgoing light 1034, the controller 1020 can also use the voltage-control signal 1028 to modify the voltage $V_3$ applied by the voltage supply 1050 to the horizontal-steering waveguide electrodes 1015 to selectively control the in-plane angle of the outgoing light 1034 in order to direct the outgoing light 1034 to any selected point within the two-dimensional field of regard 1036.

Referring again to FIG. 10, depending on the particular application of the optical system 1000, the controller 1020 can also use the voltage-control signal 1024 to modify the voltage $V_1$ applied by the voltage supply 1040 to the incoupler electrode 1013 to modify the electric field applied at the incoupler 1012, similar to the operations described earlier for the optical system 900 of FIG. 9. This control can be used to modulate the intensity of the outgoing light 1034, for example, to encode data into the outgoing light 1034, and/or fine-tune the incoupling of the incoming light 1032 into the BS device 1010, for example, to actively compensate for misalignment errors and/or temporal variations in incidence angle and/or wavelength of the incoming light 1032.

The optical system 1000 of FIG. 10 may provide one or more of the following advantages and new features:

The optical system 1000 may have significantly increased out-of-plane steering compared to conventional voltage-controlled steering of Ulrich-coupled waveguides;

With multiplexed light sources 1030, increased steering speeds can be realized by rapid source switching;

With a tunable light source 1030 and voltage-controlled steering in combination, multiple methods can be used to steer to a point, allowing greater flexibility in steering control to choose the best method;

With multiple light sources 1030, multiple zones of the total field of regard 1036 can be scanned simultaneously or nearly simultaneously, useful for such applications as LIDAR (light detection and ranging), substantially reducing the time required to scan the full field of regard; and When operating as a receiver/transceiver in combination with a detector array (not shown in FIG. 10), the wavelength-dependent dispersion can be utilized to obtain hyperspectral mapping of the field of regard 1036.

Although the BS device 1010 has been described as having single, monolithic electrodes 1013, 1015, and 1017, in other embodiments, one or more of those electrodes can be subdivided into smaller individual electrodes for greater spatial control of the tuning effect, with the voltage applied to each of these electrodes being controlled independently.

Although the optical system 1000 has been described as having three controllable voltage supplies 1040, 1050, and 1060, those skilled in the art will understand that, in some applications, one, two, or even all three of the voltage supplies as well as their corresponding electrodes 1013, 1015, and 1017 may be omitted. For example, for applications that do not require intensity modulation or incoupling fine-tuning, the voltage supply 1040 and the incoupler electrode 1013 may be omitted. Similarly, for applications that do not require modification of the in-plane angle, the voltage supply 1050 and the waveguide electrodes 1015 may be omitted. Lastly, for applications that do not require voltage-controlled modification of the out-of-plane angle, the voltage supply 1060 and the outcoupler electrode 1017 may be omitted.

Although the controllable light source 1030 has been described as a single, tunable laser, in other implementations, the controllable light source 1030 may be implemented using two or more different devices that generate incoming light 1032 having different wavelengths. Those skilled in the art will understand that, depending on the implementation, the controller 1020 can control the light source 1030 to generate the incoming light 1032 having different wavelengths at different times (e.g., time-division multiplexed) or simultaneously or both.

The optical system 1000 is depicted with the incoming light 1032 of different wavelengths having approximately the same incidence angle at the incoupler 1012 and different output angles at the outcoupler 1016. In this way, the BS device 1010 effectively functions as an optical demultiplexer. In alternative implementations, different wavelengths of the incoming light 1032 may have different incidence angles at the incoupler 1012, and, if selected appropriately, may all have approximately the same output angle at the outcoupler 1016. In that way, the BS device 1010 would effectively function as an optical multiplexer.

Figure 12:
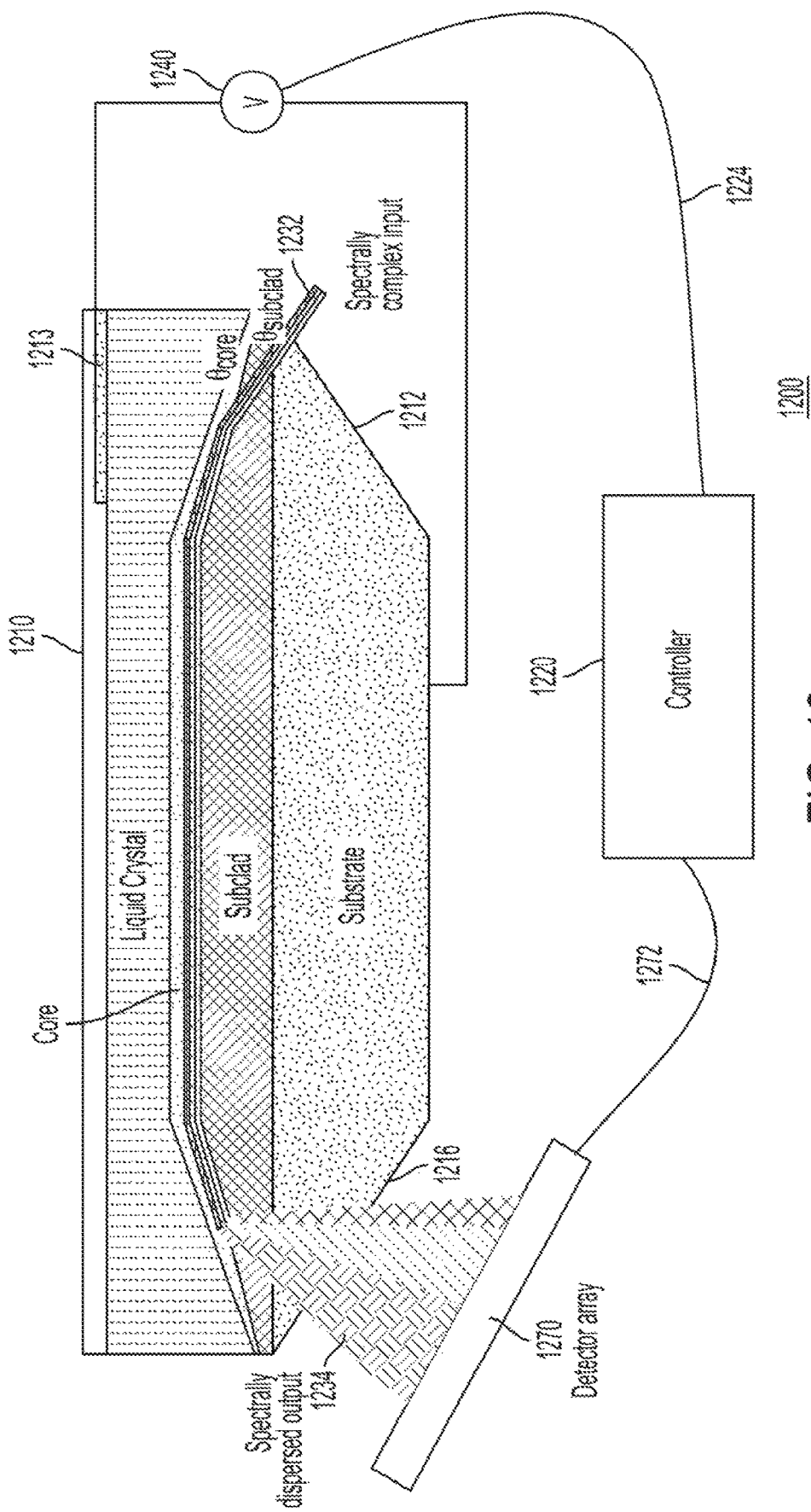
FIG. 12 is a schematic block diagram of another optical system that exploits the wavelength dependency of the output angle of outgoing light from a non-mechanical BS device.

FIG. 12 is a schematic block diagram of an optical system 1200 that exploits the wavelength dependency of the output angle of outgoing light from a non-mechanical beam steering device 1210. In addition to the BS device 1210, the optical system 1200 has a controller 1220, a detector array 1270, and a controllable voltage supply 1240, which is connected to apply a voltage to the incoupler electrode 1213. Depending on the implementation, the BS device 1210 may be a conventional BS device, such as the conventional BS device 100 of FIGS. 1A-1C; a new BS device, such as the new BS device 300 of FIG. 3; or any other suitable NMBS device.

In operation, incoming light 1232 is applied to the incoupler 1212 of the BS device 1210 at a given incidence angle from a light source (not shown). Corresponding outgoing light 1234 is directed from the outcoupler 1216 towards the detector array 1270 at an out-of-plane output angle that depends on the wavelength of the light, where the detector array 1270 generates detector signals 1272 that are processed by the controller 1220. The optical system 1200 can be calibrated using known wavelengths of incoming light 1232 to identify particular pixels in the detector array 1270 that correspond to particular wavelengths. In this way, the optical system 1200 can function as a spectrometer identifying the wavelength(s) of the incoming light 1232, which can be monochromatic or spectrally complex.

In addition to determining the wavelength(s) of the outgoing light 1234 based on which pixels are illuminated, the controller 1020 can also determine the intensity of the outgoing light 1234 by monitoring the magnitude of the detector signals 1272. Since the optimal coupling angle of the incoming light 1232 into the incoupler 1212 varies as a function of both the wavelength of the incoming light 1232 and the electric field applied across the incoupler 1212 based on the voltage applied by the voltage supply 1240 to the incoupler electrode 1213, the controller 1220 can maximize the magnitude of the detector signals 1272 by actively controlling the electric field by selectively controlling the voltage-control signal 1224 applied to the voltage supply 1240 in order to modify the optimal coupling angle to match the given incidence angle of the incoming light 1232.

Although not shown in FIG. 12, the source or sources of the incoming light 1232 may be controllable light sources that are actively controlled by the controller 1220, similar to the light source 1030 of FIG. 10.

Although not shown in FIG. 12, the BS device 1210 may have an outcoupler electrode and/or one or more horizontal-steering electrodes similar to the corresponding electrodes in the BS device 1010 of FIG. 10, and the optical system 1200 may likewise have corresponding controllable voltage supplies for those electrodes that are actively controlled by the controller 1220.

Depending on the implementations, the core thicknesses in either the incoupler or outcoupler of BS devices 1010 and 1210 of FIGS. 10 and 12 can be either tapered or fixed. Each BS device may either be designed to be single mode across the entire throughput wavelength range, multimode across the entire range, or a combination of single and multimode based on wavelength. Additional layers may be added in the coupling regions to control the degree of wavelength-based steering by engineering dispersions. The wavelength-based steering behavior may also be controlled by adjusting the optical properties of the waveguide through thermal, electrooptic, acoustooptic, and material composition approaches instead of or in addition to the electric field approaches described previously.

In certain embodiments, an optical system comprises a non-mechanical beam-steering (BS) device configured to receive incoming light at an incidence angle and output outgoing light at an output angle; a light source configured to generate the incoming light; and a controller configured to control the light source to actively control wavelength of the incoming light to control the output angle of the outgoing light output from the BS device.

In certain embodiments of the foregoing, the controller initially controls the light source to generate the incoming light having a first wavelength, such that the outgoing light of the first wavelength has a first output angle; and the controller subsequently controls the light source to generate the incoming light having a second wavelength different from the first wavelength, such that the outgoing light of the second wavelength has a second output angle different from the first output angle.

In certain embodiments of the foregoing, the controller is configured to control the light source to simultaneously generate the incoming light having two or more different wavelengths such that the corresponding outgoing light simultaneously has two or more different output angles.

In certain embodiments of the foregoing, the BS device further comprises one or more of (i) an incoupler electrode, (ii) one or more horizontal-steering electrodes, and (iii) an outcoupler electrode, and for each electrode, the system further comprises a controllable voltage supply configured to be actively controlled by the controller to apply a selected voltage to the corresponding electrode to apply an electric field to the BS device to actively control at least one operating characteristic of the BS device.

In certain embodiments of the foregoing, the BS device comprises two or more of (i) the incoupler electrode, (ii) the one or more horizontal-steering electrodes, and (iii) the outcoupler electrode.

In certain embodiments of the foregoing, the BS device comprises (i) the incoupler electrode, (ii) the one or more horizontal-steering electrodes, and (iii) the outcoupler electrode.

In certain embodiments of the foregoing, the BS device comprises the incoupler electrode; and the system comprises a controllable, incoupler-electrode voltage supply configured to be actively controlled by the controller to apply a selected incoupler-electrode voltage to the incoupler electrode to apply an electric field to an incoupler of the BS device to actively control at least one of (i) amplitude of the outgoing light and (ii) incoupling angle of the BS device.

In certain embodiments of the foregoing, the BS device comprises the one or more horizontal-steering electrodes; and the system comprises a controllable, horizontal-steering voltage supply configured to be actively controlled by the controller to apply a selected horizontal-steering voltage to the horizontal-steering electrode to apply an electric field to a planar waveguide region of the BS device to actively control in-plane output angle of the outgoing light.

In certain embodiments of the foregoing, the BS device comprises the outcoupler electrode; and the system comprises a controllable, outcoupler-electrode voltage supply configured to be actively controlled by the controller to apply a selected outcoupler-electrode voltage to the outcoupler electrode to apply an electric field to an outcoupler of the BS device to actively control out-of-plane output angle of the outgoing light.

In certain embodiments of the foregoing, for each wavelength of two or more different wavelengths, the controller is configured to control the outcoupler-electrode voltage to cover a corresponding range of out-of-plane output angles; and, for the two or more different wavelengths, the corresponding ranges of the out-of-plane output angles collectively cover a contiguous field of regard.

In certain embodiments of the foregoing, the BS device comprises an Ulrich incoupler and an Ulrich outcoupler.

In certain embodiments of the foregoing, the BS device comprises an incoupler and an outcoupler separated by a planar waveguide region, wherein at least one of the incoupler and the outcoupler comprises a substrate and a plurality of thin-film layers over the substrate and forming an optical waveguide, wherein at least two of the thin-film layers have spatially varying optical thicknesses.

In certain embodiments of the foregoing, the plurality of thin-film layers comprises a subcladding layer over the substrate and having a spatially varying optical thickness and a core layer over the subcladding layer and having a spatially varying optical thickness.

In certain embodiments, an optical system comprises a non-mechanical BS device configured to receive incoming light at an incidence angle and output outgoing light at one or more output angles; a detector array configured to receive the outgoing light and generate corresponding detector signals; and a controller configured to process the detector signals to determine one or more wavelengths of the outgoing light.

In certain embodiments of the foregoing, the system further comprises an incoupler-electrode voltage supply, wherein the controller is configured to actively control voltage applied by the incoupler-electrode voltage supply to an incoupler electrode of the BS device in order to control incoupling angle of the BS device.

In certain embodiments of the foregoing, the controller is configured to control the incoupler-electrode voltage supply based on the detector signals in order to modify the incoupling angle of the BS device.

In certain embodiments of the foregoing, the BS device comprises an Ulrich incoupler and an Ulrich outcoupler.

In certain embodiments of the foregoing, the BS device comprises an incoupler and an outcoupler separated by a planar waveguide region, wherein at least one of the incoupler and the outcoupler comprises a substrate and a plurality of thin-film layers over the substrate and forming an optical waveguide, wherein at least two of the thin-film layers have spatially varying optical thicknesses.

In certain embodiments of the foregoing, the plurality of thin-film layers comprises a subcladding layer over the substrate and having a spatially varying optical thickness and a core layer over the subcladding layer and having a spatially varying optical thickness.

Different implementations of the BS devices described herein, such as the conventional BS device 100 of FIGS. 1A and 1B, the new BS device 300 of FIG. 3, the BS device 700 of FIG. 7, the BS device 1010 of FIG. 10, and the BS device 1210 of FIG. 12, can be designed to operate at different wavelengths of light including (without limitation) ultraviolet, visible, near-infrared, short-wave infrared, mid-wave infrared, and/or long-wave infrared wavelengths.

Although the optical couplers described herein have a liquid crystal top cladding layer, in alternative embodiments, the top cladding layer may be made of a different suitable material including air.

Depending on the wavelength region of interest and other requirements of the coupler, other material sets may be used, including but not limited to oxides (e.g., $SiO_x$), oxynitrides (e.g., $SiO_xN_y$), nitrides (e.g., $SiN_x$), fluorides (e.g., $MgF_2$), Group-IV semiconductors (e.g., Ge), III-V compounds (e.g., GaAs), II-VI compounds (e.g., CdS), and other chalcogenide compounds (e.g., GeAsSeTe glasses).

In addition to or instead of shadow mask tapering, alternative tapering methods may be used, such as mechanical polishing, grayscale lithography, or a mask that is translated during deposition.

In addition to tapering the core and/or the subcladding, multiple other layers may be tapered, including the top cladding, substrate, or other incoupling layers that exist only within the coupling region, such as an incoupling layer between the subcladding and core. The taper profiles on these layers may be linear or nonlinear and may differ for different instances of the couplers to control the effective index within the incoupling region.

Additional methods of providing a spatially controlled effective index may be used, including but not limited to spatially varying the composition and refractive index of the core (e.g., $As_2(S_xSe_y)$ deposited via gradient techniques or through selective diffusion, where x and y vary across the coupling region), sub-wavelength effective medium structures, thermal gradients, and electro-optic effects.

Although techniques have been described for controlling optical couplers by applying fields to either the incouple or the outcouple, those skilled in the art will understand that optical couplers can also be controlled by applying fields to both the incouple and the outcouple.

Although techniques have been described for controlling the characteristics of optical couplers by modifying the magnitudes of applied electric fields to take advantage of the voltage-dependent optical birefringence of liquid crystal, in other embodiments, other methods to dynamically adjust the waveguide effective index may be used, including but not limited to thermo-optic effects, solid-state electro-optic effects such as ferroelectric birefringence, amorphous-to-crystalline phase change, and semiconductor field effect induced index changes, or other methods including acousto-optic or magnetic field-driven effects.

Although the optical couplers described herein have a top cladding layer that has optical properties that are dependent on an applied (e.g., electrical) field, in alternative embodiments, in addition to or instead of the top cladding layer, optical couplers may have one or more other layers, such as a subcladding layer or a core layer, that have such optical properties.

As used herein, a teaching that a device shown in a figure has a second layer that is "over" a first layer implies that the second layer is above the first layer when the device is oriented as shown in that figure. The term "over" applies when the second layer physically abuts the first layer as well as when there are one or more intervening layers between the first and second layers. If the second layer physically abuts the first layer, then the second layer may be said to be "directly above" the first layer.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. An optical system comprising:
a non-mechanical beam-steering (BS) device configured to receive incoming light at an incidence angle and output outgoing light at an output angle;
a light source configured to generate the incoming light; and
a controller configured to control the light source to actively control wavelength of the incoming light to control the output angle of the outgoing light output from the BS device.

2. The system of claim 1, wherein:
the controller initially controls the light source to generate the incoming light having a first wavelength, such that the outgoing light of the first wavelength has a first output angle; and
the controller subsequently controls the light source to generate the incoming light having a second wavelength different from the first wavelength, such that the outgoing light of the second wavelength has a second output angle different from the first output angle.

3. The system of claim 1, wherein the controller is configured to control the light source to simultaneously generate the incoming light having two or more different wavelengths such that the corresponding outgoing light simultaneously has two or more different output angles.

4. The system of claim 1, wherein:
the BS device further comprises one or more of (i) an incoupler electrode, (ii) one or more horizontal-steering electrodes, and (iii) an outcoupler electrode; and
for each electrode, the system further comprises a controllable voltage supply configured to be actively controlled by the controller to apply a selected voltage to the corresponding electrode to apply an electric field to the BS device to actively control at least one operating characteristic of the BS device.

5. The system of claim 4, wherein the BS device comprises two or more of (i) the incoupler electrode, (ii) the one or more horizontal-steering electrodes, and (iii) the outcoupler electrode.

6. The system of claim 5, wherein the BS device comprises (i) the incoupler electrode, (ii) the one or more horizontal-steering electrodes, and (iii) the outcoupler electrode.

7. The system of claim 4, wherein:
the BS device comprises the incoupler electrode; and
the system comprises a controllable, incoupler-electrode voltage supply configured to be actively controlled by the controller to apply a selected incoupler-electrode voltage to the incoupler electrode to apply an electric field to an incoupler of the BS device to actively control at least one of (i) amplitude of the outgoing light and (ii) incoupling angle of the BS device.

8. The system of claim 4, wherein:
the BS device comprises the one or more horizontal-steering electrodes; and
the system comprises a controllable, horizontal-steering voltage supply configured to be actively controlled by the controller to apply a selected horizontal-steering voltage to the horizontal-steering electrode to apply an electric field to a planar waveguide region of the BS device to actively control in-plane output angle of the outgoing light.

9. The system of claim 4, wherein:
the BS device comprises the outcoupler electrode; and
the system comprises a controllable, outcoupler-electrode voltage supply configured to be actively controlled by the controller to apply a selected outcoupler-electrode voltage to the outcoupler electrode to apply an electric field to an outcoupler of the BS device to actively control out-of-plane output angle of the outgoing light.

10. The system of claim 9, wherein:
for each wavelength of two or more different wavelengths, the controller is configured to control the outcoupler-electrode voltage to cover a corresponding range of out-of-plane output angles; and
for the two or more different wavelengths, the corresponding ranges of the out-of-plane output angles collectively cover a contiguous field of regard.

11. The system of claim 1, wherein the BS device comprises an Ulrich incoupler and an Ulrich outcoupler.

12. The system of claim 1, wherein the BS device comprises an incoupler and an outcoupler separated by a planar waveguide region, wherein at least one of the incoupler and the outcoupler comprises:
a substrate; and
a plurality of thin-film layers over the substrate and forming an optical waveguide, wherein at least two of the thin-film layers have spatially varying optical thicknesses.

13. The system of claim 12, wherein the plurality of thin-film layers comprises:
a subcladding layer over the substrate and having a spatially varying optical thickness; and
a core layer over the subcladding layer and having a spatially varying optical thickness.

14. An optical system comprising:
a non-mechanical BS device configured to receive incoming light at an incidence angle and output outgoing light at one or more output angles;
a detector array configured to receive the outgoing light and generate corresponding detector signals; and a controller configured to process the detector signals to determine one or more wavelengths of the outgoing light.

15. The system of claim 14, further comprising an incoupler-electrode voltage supply, wherein the controller is configured to actively control voltage applied by the incoupler-electrode voltage supply to an incoupler electrode of the BS device in order to control incoupling angle of the BS device.

16. The system of claim 15, wherein the controller is configured to control the incoupler-electrode voltage supply based on the detector signals in order to modify the incoupling angle of the BS device.

17. The system of claim 14, wherein the BS device comprises an Ulrich incoupler and an Ulrich outcoupler.

18. The system of claim 14, wherein the BS device comprises an incoupler and an outcoupler separated by a planar waveguide region, wherein at least one of the incoupler and the outcoupler comprises:
   a substrate; and
   a plurality of thin-film layers over the substrate and forming an optical waveguide, wherein at least two of the thin-film layers have spatially varying optical thicknesses.

19. The system of claim 18, wherein the plurality of thin-film layers comprises:
   a subcladding layer over the substrate and having a spatially varying optical thickness; and
   a core layer over the subcladding layer and having a spatially varying optical thickness.

* * * * *